(12) United States Patent
Goulet

(10) Patent No.: US 11,946,584 B2
(45) Date of Patent: Apr. 2, 2024

(54) COMPOSITE INSULATION SYSTEM

(71) Applicant: SAPREX, LLC, Gastonia, NC (US)

(72) Inventor: Robert Jacque Goulet, Gastonia, NC (US)

(73) Assignee: NELSON GLOBAL PRODUCTS, INC., Stoughton, WI (US)

( * ) Notice: Subject to any disclaimer, the term of this patent is extended or adjusted under 35 U.S.C. 154(b) by 659 days.

(21) Appl. No.: 16/462,115

(22) PCT Filed: Nov. 20, 2017

(86) PCT No.: PCT/US2017/062573
§ 371 (c)(1),
(2) Date: May 17, 2019

(87) PCT Pub. No.: WO2018/094339
PCT Pub. Date: May 24, 2018

(65) Prior Publication Data
US 2019/0329486 A1 Oct. 31, 2019

Related U.S. Application Data

(60) Provisional application No. 62/424,164, filed on Nov. 18, 2016.

(51) Int. Cl.
*B29C 53/58* (2006.01)
*B29C 63/04* (2006.01)
(Continued)

(52) U.S. Cl.
CPC .............. *F16L 59/22* (2013.01); *B29C 53/58* (2013.01); *B29C 53/588* (2013.01);
(Continued)

(58) Field of Classification Search
CPC ..... B29C 53/58; B29C 53/583; B29C 53/588; B29C 53/8066; B29C 53/8075;
(Continued)

(56) References Cited

U.S. PATENT DOCUMENTS 1,717,215 A * 6/1929 Huber ...................... D04C 1/00
87/2
2,148,164 A * 2/1939 Krippendorf ............ D04C 1/06
87/37
(Continued)

FOREIGN PATENT DOCUMENTS

| CH | 675984 A5 | 11/1990 |
| CN | 2120185 U | 10/1992 |

(Continued)

OTHER PUBLICATIONS

Saprex, LLC, International Patent Application No. PCT/US2017/062573, International Preliminary Report on Patentability, dated May 21, 2019.

(Continued)

*Primary Examiner* — Michael A Tolin
(74) *Attorney, Agent, or Firm* — Moore & Van Allen, PLLC; Henry B. Ward, III

(57) ABSTRACT

Embodiments of the present invention provide a self-molding composite system for insulation and covering operations. The self-molding composite system may be cured to form any desired shaped for insulation and covering operations. The composite system comprises one or more layers that may create a rigid layered composite when cured. The one or more layers of the composite system may include a base layer that is a braided, knit, or non-woven fiber based substrate, an interstitial matrix layer, and customizable top coat. The customizable top coat may be a solvent based polymer solution that includes various additives that may include color pigments, additives for additional abrasion protection, additives for thermal protection, and/or additives for creating various textures or visible appearances to the composite system.

15 Claims, 17 Drawing Sheets

(51) Int. Cl.

| | | |
|---|---|---|
| B29C 63/10 | (2006.01) | |
| B29C 70/30 | (2006.01) | |
| B29C 70/68 | (2006.01) | |
| B29L 23/00 | (2006.01) | |
| B32B 5/02 | (2006.01) | |
| B32B 15/14 | (2006.01) | |
| D04B 1/22 | (2006.01) | |
| D04B 21/20 | (2006.01) | |
| D04C 1/06 | (2006.01) | |
| F16L 57/06 | (2006.01) | |
| F16L 59/02 | (2006.01) | |
| F16L 59/10 | (2006.01) | |
| F16L 59/16 | (2006.01) | |
| F16L 59/22 | (2006.01) | |
| B29K 101/12 | (2006.01) | |
| B29K 105/00 | (2006.01) | |
| B29K 105/08 | (2006.01) | |

(52) U.S. Cl.
CPC ........... *B29C 63/048* (2013.01); *B29C 63/10* (2013.01); *B29C 70/30* (2013.01); *B29C 70/682* (2013.01); *B32B 5/024* (2013.01); *B32B 5/026* (2013.01); *B32B 15/14* (2013.01); *D04B 1/225* (2013.01); *D04B 21/205* (2013.01); *D04C 1/06* (2013.01); *F16L 57/06* (2013.01); *F16L 59/027* (2013.01); *F16L 59/028* (2013.01); *F16L 59/029* (2013.01); *F16L 59/10* (2013.01); *F16L 59/106* (2013.01); *F16L 59/168* (2013.01); *B29K 2101/12* (2013.01); *B29K 2105/0005* (2013.01); *B29K 2105/0809* (2013.01); *B29K 2995/0015* (2013.01); *B29L 2023/225* (2013.01); *B32B 2305/184* (2013.01); *B32B 2307/304* (2013.01); *B32B 2597/00* (2013.01); *D10B 2401/04* (2013.01); *F16L 59/163* (2013.01)

(58) Field of Classification Search
CPC ........... B29C 63/0017; B29C 63/0078; B29C 63/048; B29C 63/06; B29C 63/08; B29C 63/10; B29C 63/18; B29C 2063/006; B29C 70/22; B29C 70/30; B29C 70/68; B29C 70/681; B29C 70/682; B29K 2101/12; B29K 2105/0005; B29K 2105/0011; B29K 2105/0809; B29K 2105/0827; B29K 2995/0015; B29K 2995/0089; B29L 2023/225; B32B 5/02; B32B 5/024; B32B 5/026; B32B 15/14; B32B 2305/184; B32B 2307/304; B32B 2597/00; D02G 3/22; D04B 1/225; D04B 21/205; D04C 1/02; D04C 1/04; D04C 1/06; F16L 57/06; F16L 59/021; F16L 59/027; F16L 59/10; F16L 59/106; F16L 59/16; F16L 59/168; F16L 59/02; F16L 59/028; F16L 59/029; F16L 59/14; F16L 59/163; F16L 59/22; D10B 2401/04; D10B 2505/02

See application file for complete search history.

(56) References Cited

U.S. PATENT DOCUMENTS

| | | |
|---|---|---|
| 2,688,895 A | 9/1954 | Houghton |
| 2,924,546 A | 2/1960 | Shaw |
| 3,053,715 A | 9/1962 | Labino |
| 3,092,530 A | 6/1963 | Plummer |
| 3,312,250 A | 4/1967 | Sirignano et al. |
| 3,616,123 A | 10/1971 | Reynolds et al. |
| 3,652,375 A | 3/1972 | Johnson |
| 3,828,119 A | 8/1974 | Warburton et al. |
| 4,026,381 A | 5/1977 | Conley |
| 4,054,710 A | 10/1977 | Botsolas |
| 4,282,284 A | 8/1981 | George |
| 4,299,884 A | 11/1981 | Payen |
| 4,428,999 A | 1/1984 | George et al. |
| 4,655,866 A | 4/1987 | Ferrier |
| 4,870,887 A | 10/1989 | Tresslar et al. |
| 5,092,122 A | 3/1992 | Bainbridge |
| 5,134,846 A | 8/1992 | White |
| 5,256,459 A | 10/1993 | Carlson |
| 5,274,196 A | 12/1993 | Weinberg |
| 5,343,895 A | 9/1994 | King et al. |
| 5,413,149 A | 5/1995 | Ford et al. |
| 5,549,947 A | 8/1996 | Quigley |
| 5,556,677 A | 9/1996 | Quigley |
| 5,615,711 A | 4/1997 | Lewis |
| 5,617,900 A | 4/1997 | Weil |
| 5,639,552 A | 6/1997 | Fukushima |
| 5,660,899 A | 8/1997 | Rockney et al. |
| 5,712,010 A | 1/1998 | Russek et al. |
| 5,795,835 A | 8/1998 | Bruner et al. |
| 5,849,379 A | 12/1998 | Gladfelter et al. |
| 5,972,512 A | 10/1999 | Boisvert et al. |
| 5,974,784 A | 11/1999 | Feldman |
| 5,985,385 A | 11/1999 | Gottfried |
| 6,045,884 A | 4/2000 | Hess et al. |
| 6,250,193 B1 | 6/2001 | Head |
| 6,276,401 B1 | 8/2001 | Wilson |
| 6,527,015 B2 | 3/2003 | Lively |
| 6,572,723 B1 | 6/2003 | Tilton et al. |
| 6,610,928 B2 | 8/2003 | Snyder |
| 6,769,455 B2 | 8/2004 | Toas et al. |
| 6,978,643 B2 | 12/2005 | Akers et al. |
| 7,007,720 B1 | 3/2006 | Chase et al. |
| 7,152,633 B2 | 12/2006 | White |
| 7,544,890 B2 * | 6/2009 | Herborth ............... B29D 23/001 174/481 |
| 8,950,168 B2 | 2/2015 | Heitmann et al. |
| 9,145,627 B2 | 9/2015 | Wilson et al. |
| 9,388,515 B2 | 7/2016 | Goulet |
| 9,976,687 B2 | 5/2018 | Goulet |
| 10,293,544 B2 | 5/2019 | Goulet |
| 10,295,109 B2 | 5/2019 | Goulet |
| 10,591,104 B2 | 3/2020 | Goulet |
| 2002/0168488 A1 | 11/2002 | Gladfelter et al. |
| 2005/0126651 A1 | 6/2005 | Sherwin |
| 2005/0155663 A1 | 7/2005 | Dhellemmes et al. |
| 2006/0229381 A1 | 10/2006 | Bartko |
| 2007/0049148 A1 | 3/2007 | Chien et al. |
| 2007/0131299 A1 | 6/2007 | Kombleet |
| 2007/0251595 A1 | 11/2007 | Chen |
| 2008/0017263 A1 | 1/2008 | Robinson |
| 2009/0050256 A1 | 2/2009 | Green et al. |
| 2009/0078499 A1 | 3/2009 | Sikes et al. |
| 2009/0197044 A1 | 8/2009 | Pelzer et al. |
| 2009/0277526 A1 | 11/2009 | Merry |
| 2010/0139197 A1 | 6/2010 | Woodhall |
| 2010/0154916 A1 | 6/2010 | Jackson et al. |
| 2010/0154917 A1 | 6/2010 | Batallas et al. |
| 2010/0201023 A1 | 8/2010 | Piccione et al. |
| 2010/0263761 A1 | 10/2010 | Niccolls et al. |
| 2010/0316822 A1 * | 12/2010 | Malloy ............... D06N 3/0015 428/36.1 |
| 2011/0000572 A1 | 1/2011 | Ramaswamy et al. |
| 2012/0082807 A1 | 4/2012 | Malloy et al. |
| 2012/0149268 A1 | 6/2012 | Lake et al. |
| 2012/0291903 A1 * | 11/2012 | Ekelund ............... F16L 55/1657 138/97 |
| 2013/0097839 A1 | 4/2013 | Latham et al. |
| 2013/0299035 A1 | 11/2013 | Laurent et al. |
| 2013/0306186 A1 | 11/2013 | Goulet |
| 2014/0020766 A1 | 1/2014 | Kremers |
| 2014/0094077 A1 | 4/2014 | Goulet |
| 2015/0000259 A1 * | 1/2015 | Dietz ............... H01B 3/00 60/320 |

(56) References Cited

U.S. PATENT DOCUMENTS

| | | |
|---|---|---|
| 2016/0311152 A1 | 10/2016 | Goulet |
| 2018/0023222 A1 | 1/2018 | Zhang et al. |
| 2020/0217443 A1 | 7/2020 | Lubenow et al. |
| 2020/0217444 A1 | 7/2020 | Goulet |

FOREIGN PATENT DOCUMENTS

| | | |
|---|---|---|
| CN | 101119042 A | 2/2008 |
| CN | 101848959 A | 9/2010 |
| CN | 102575115 A | 7/2012 |
| CN | 102654219 A | 9/2012 |
| CN | 109073134 A | 4/2017 |
| CN | 109073134 A | 12/2018 |
| DE | 102010028433 A1 | 11/2011 |
| EP | 0327148 A1 | 8/1989 |
| EP | 0877892 B1 | 11/1999 |
| EP | 1772604 A1 | 4/2007 |
| GB | 2166512 A | 5/1986 |
| JP | 07269340 A | 10/1995 |
| JP | 2001289392 A | 10/2001 |
| JP | 2005513226 A | 5/2005 |
| JP | 2005163830 A | 6/2005 |
| JP | 3183361 U | 5/2013 |
| RU | 2303744 C2 | 7/2007 |
| RU | 2380606 C2 | 1/2010 |
| RU | 2438065 C2 | 12/2011 |
| WO | 9732067 A1 | 9/1997 |
| WO | 2000073695 A | 12/2000 |
| WO | 2005085608 A1 | 9/2005 |
| WO | 2017181197 A1 | 10/2017 |

OTHER PUBLICATIONS

Saprex, LLC, Russian Patent Application No. 2018140073, Office Action, dated May 17, 2019.
Bondaletova, L. and Bondaletov, V., "Polymer composition materials", part I, Tomsk, 2013, pp. 16-63. Month of Publication Unknown.
Chinese Office Action issued by the Chinese Patent Office for corresponding Chinese Patent Application No. 2017800265042, dated Dec. 19, 2019, 12 pages.
Chinese Search Report issued by the Chinese Patent Office for corresponding Chinese Patent Application No. 2017800265042, dated Dec. 11, 2019, 5 pages.
Japanese Office Action issued by the Japanese Patent Office for corresponding Japanese Patent Application No. 2019505340, dated Jan. 15, 2020, 16 pages.
Restriction Requirement issued by the United States Patent and Trademark Office for U.S. Appl. No. 16/092,838, dated May 14, 2021.
Office Action issued by the Brazilian Patent Office for Brazilian Patent Application No. BR112018070774-0, dated Jun. 15, 2021.
Office Action issued by the European Patent Office for European Patent Application No. 17871914.2, dated Jun. 17, 2021.
Office Action issued by the United States Patent and Trademark Office for U.S. Appl. No. 16/413,353, dated Jun. 16, 2021.
Supplementary European Search Report dated Aug. 29, 2017, by the European Patent Office for related Patent Application No. 13791680.5.
International Search Report dated Sep. 20, 2013, for related International Patent Application No. PCT/US2013/041391.
Written Opinion dated Sep. 20, 2013, for related International Patent Application No. PCT/US2013/041391.
International Preliminary Report on Patentability dated Nov. 18, 2014, for related International Patent No. PCT/US2013/041391.
Canadian Office Action and Search Report dated Oct. 2, 2018, for related Canadian Patent Application No. 2,919,854.
Decision to grant dated Sep. 14, 2018, by the European Patent Office for related European Patent No. 13791680.5.
Office Action dated Apr. 12, 2018, by the European Patent Office for European Patent Application No. 13791680.5.
Notice of allowance dated Jul. 24, 2019, by the Canadian Intellectual Property Office for Canadian Patent Application No. 2,912,854.
Final Office Action issued by the United States Patent and Trademark Office for U.S. Appl. No. 16/818,395, dated Mar. 8, 2021.
Notice of Allowance issued by the United States Patent and Trademark Office for U.S. Appl. No. 16/818,395, dated Mar. 24, 2021.
Office Action issued by the United States Patent and Trademark Office for U.S. Appl. No. 16/818,395, dated Oct. 6, 2020.
Extended European Search Report issued by the European Patent Office for corresponding European Patent Application No. 17783373. 8-1010 / 3443254, dated Nov. 27, 2019, 7 pages.
Chinese Search Report issued by the Chinese Patent Office for Chinese Patent Application No. 201780083881X, dated Sep. 23, 2020.
Chinese Office Action issued by the Chinese Patent Office for Chinese Patent Application No. 201780083881X, dated Sep. 28, 2020.
Decision to Grant issued by the Federal Service for Intellectual Property for corresponding Russian Patent Application No. 2018140073/06(066643) dated Jun. 17, 2020, 5 pages.
Supplementary European Search Report issued by the European Patent Office for corresponding Application EP 17871914 dated Jul. 8, 2020.
Office Action issued by the Japanese Patent Office for corresponding Japanese Patent Application No. 2019-527220, dated Aug. 21, 2020.
Canadian Office Action issued by the Canadian Patent Office for Canadian Patent Application No. 3,060,052, dated Dec. 9, 2020.
European Office Action issued by the European Patent Office for European Patent Application No. 17783373.8, dated Mar. 9, 2021.
Office Action issued by the Canadian Patent Office for Canadian Patent Application No. 3,082,881, dated Aug. 11, 2021.
Examination Search Report issued by the Canadian Patent Office for Canadian Patent Application No. 3,082,881, dated Jul. 16, 2021.
Office Action issued by the Brazilian Patent Office for Patent Application No. BR112019010119-5, dated Aug. 31, 2021.
Second Office Action issued by the Chinese Patent Office for Chinese Patent Application No. 201780083881.X, dated Jul. 12, 2021.
Office Action issued by the United States Patent Office for U.S. Appl. No. 16/092,838, dated Oct. 1, 2021.
International Search Report dated Jul. 5, 2017, for related International Patent Application No. PCT/US2017/027994.
Written Opinion dated Jul. 5, 2017, for related International Patent Application No. PCT/US2017/027994.
International Search Report dated Jan. 30, 2018, for corresponding International Patent Application No. PCT/US2017/062573.
Written Opinion dated Jan. 30, 2018, for corresponding International Patent Application No. PCT/US2017/062573.
International Preliminary Report on Patentability dated Oct. 16, 2018, for related International Patent Application No. PCT/US2017/027994.
Russian Office Action issued by the Patent Office of the Russian Federation for corresponding Russian Patent Application No. 2019118633, dated Nov. 28, 2019, 14 pages.
Russian Search Report issued by the Patent Office of the Russian Federation for corresponding Russian Patent Application No. 2019118633, dated Nov. 22, 2019, 2 pages.
Final Rejection issued by the United States Patent Office for U.S. Appl. No. 16/818,395, dated Nov. 10, 2021.
Amended Invalidity Contentions filed by defendant, Lincoln Industries on Mar. 29, 2021, in the United States District Court for the District of Nebraska in Case No. 8:20-cv-338-BCB-SMB.
Tighitco Phenolic and Polymide Insulation Blankets webpage, purportedly used or sold by Tighitco, purported Publication Date of Apr. 4, 2003.
Tighitco Phenolic and Polymide Insulation Systems webpage, purportedly used or sold by Tighitco, purported Publication Date of Mar. 7, 2010.
ThermoLinc Elite, purportedly used or sold by Lincoln Industries, purported Publication Date of at least as early as 2016. Month of Publication Unknown.

(56) References Cited

OTHER PUBLICATIONS

Glass Fiber Composite Shell, purportedly used or sold by Bosal, purported Publication Date of Jul. 2, 2017.
Composite Insulation Coating, purportedly used or sold by Thermal Structures, purported Publication Date of at least as early as Jul. 9, 2013.
ThermoJacket S Datasheet, purportedly used or sold by Federal Mogul, purported Publication Date of Mar. 2005.
ThermoJacket S Material Safety Data Sheet, purportedly used or sold by Federal Mogul, purported Publication Date of Sep. 26, 2005.
ThermoJacket S Product Description, purportedly used or sold by Federal Mogul, purported Publication Date of at least as early as 2008. Month of Publication Unknown.
ThermoJacket R Product Description, purportedly used or sold by Federal Mogul, purported Publication Date of Mar. 24, 2011.
ThermFlex 1212 Product Description, purportedly used or sold by Federal Mogul, purported Publication Date of at least as early as 2008. Month of Publication Unknown.
ThermFlex 1212 Datasheet, purportedly used or sold by Federal Mogul, purported Publication Date of at least as early as 2008. Month of Publication Unknown.
ThermFlex 1212 Material Safety Data Sheet, purportedly used or sold by Federal Mogul, purported Publication Date of Aug. 29, 2005.
ThermFlex 1212 (with End Dips) Material Safety Data Sheet, purportedly used or sold by Federal Mogul, purported Publication Date of Aug. 22, 2005.
ThermFlex 1210 Material Safety Data Sheet, purportedly used or sold by Federal Mogul, purported Publication Date of Nov. 14, 2013.
ThermFlex 1210 Product Description, purportedly used or sold by Federal Mogul, purported Publication Date of at least as early as 2008. Month of Publication Unknown.
High Temperature Sleeving, purportedly used or sold by Techflex, purported Publication Date of May 31, 2010.
Insultherm (FG) webpage, purportedly used or sold by Techflex, purported Publication Date of Mar. 14, 2007.
Insultherm webpage, purportedly used or sold by Techflex, purported Publication Date of Jun. 5, 2010.
"Hard Coat" insulation a new direction for insulation blanket manufacturer, purportedly used or sold by Firwin Corp., purported Publication Date of Nov. 12, 2008.
Insulation Coating, purportedly used or sold by Firwin Corp., purported Publication Date of Dec. 2008.
Hard Coat Insulation for Engine Parts and Exhausts, purportedly used or sold by Firwin Corp., purported Publication Date of Apr. 6, 2009.
Making Hard (or Soft) Choices, purportedly used or sold by Firwin Corp., purported Publication Date of Oct. 2009.
Performance Evaluation of Firwin Hard Coat Insulation, purportedly used or sold by Firwin Corp., purported Publication Date of Oct. 2009.
Hard-Coat Insulation for Engine Parts and Exhausts, purportedly used or sold by Firwin Corp., purported Publication Date of May 2011.
Firwin HC Hard Coat Insulations—FAQ's, purportedly used or sold by Firwin Corp., purported Publication Date of Nov. 3, 2011.
Firwin Hard Coat Composite Insulation webpage, purportedly used or sold by Firwin Corp., purported Publication Date of Aug. 24, 2012.
Final Rejection issued by the United States Patent and Trademark Office for U.S. Appl. No. 16/092,838, dated Mar. 15, 2022.
Office Action issued by the European Patent Office for European Patent Application No. 17 871 914.2, dated Apr. 13, 2022.
Final rejection issued by the United States Patent and Trademark Office for U.S. Appl. No. 16/413,353, dated Mar. 18, 2022.
Office Action issued by the European Patent Office for European Patent Application No. 17 783 373.8, dated Oct. 20, 2022.
Office Action issued by the Brazilian Patent Office for Brazilian Patent Application No. BR112019010119-5, dated Oct. 27, 2022.
Office Action issued by the United States Patent Office for U.S. Appl. No. 16/413,353, dated Nov. 29, 2022.
Office Action issued by the United States Patent Office for U.S. Appl. No. 16/092,838, dated Nov. 17, 2022.
Office Action issued by the Brazilian Patent Office for Brazilian Patent Application No. BR112018070774-0, dated Jan. 11, 2023.
Office Action issued by the European Patent Office for European Patent Application No. 17 871 914.2, dated Jan. 31, 2023.
Notice of Allowance issued by the United States Patent and Trademark Office for U.S. Appl. No. 16/818,395, dated Feb. 23, 2023.
Corrected Notice of Allowance issued by the United States Patent and Trademark Office for U.S. Appl. No. 16/818,395, dated Mar. 9, 2023.
Office Action issued by the United States Patent Office for U.S. Appl. No. 16/413,353, dated Jul. 5, 2022.
Office Action issued by the Brazil Patent Office for Brazil Patent Application No. BR112018070774-0, dated Jul. 7, 2022.
Notice of Allowance issued by the United States Patent and Trademark Office for U.S. Appl. No. 16/092,838, dated Aug. 23, 2023.
Office Action issued by the Mexican Patent Office for Mexican Patent Application No. MX/a/2018/012526, dated Sep. 4, 2023.
Office Action issued by the European Patent Office for European Patent Application No. 17871914.2, dated Nov. 20, 2023.

\* cited by examiner

COMPOSITE INSULATION SYSTEM

FIELD OF THE INVENTION

The present invention typically relates to, in general, a mass customizable pipe insulation system for industrial, automotive and recreational vehicle applications that involve transport of fluids through pipes and ducts.

BACKGROUND

Insulated pipes in the industrial and transportation sectors often are unique to a particular application and they are often low volume parts with annual requirements below a thousand units per year. In many applications, the insulation is required to be manufactured specifically for the desired pipe geometry and the specific insulation requirements of the application. Typically, the insulation is not flexible or adaptable for different configurations. Often the insulation is required to perform thermal insulation, pipe protection, be astatically acceptable and be durable for long durations. Current methods typically require part specific tooling or manually intensive installation methods and typically do not perform at the desired level in one or more areas. Often pipe insulation is uniform throughout the part to minimize application complexity, yet the thermal loss exhibited throughout the system is non-uniform.

Furthermore, automotive and industrial piping typically comprise complex shapes, reductions, or the like in order to be directed into the proper exit point and often any single part is a unique part. Therefore, there is a need for a customizable insulation system that is infinitely configurable for various applications.

BRIEF SUMMARY OF THE INVENTION

Embodiments of the present invention addresses the above needs and/or achieve other advantages by providing apparatuses and methods for a mass-customizable, self-molding, fiber-reinforced composite insulation system that can be simply applied to an individual pipes or efficiently run on high-volume part configurations. Embodiments of the invention relate to, in general, a fiber-reinforced composite insulation system that is configured to be applied to a component comprising: one or more structural reinforcement layers, the one or more structural reinforcement layers being configured to conform to the component; a self-molding fiber cover comprising a spring-like structure configured to provide compression around the component; and one or more liquid polymer matrix solutions configured to be applied to the one or more structural reinforcement layers and/or the self-molding fiber cover positioned on the component to form the fiber-reinforced composite insulation system when cured. As such, in some instances, the system comprises a highly flexible, self-molding cover, one or more fibrous base layers, one or more highly customizable matrix systems, a topcoat and a clamping mechanism, which are configured to be provided/assembled on a component and heat cured on a component without requiring the aid of external molds.

In some embodiments, or in combination with any of the previous embodiments, wherein the one or more structural reinforcement layers comprise structural fibers, resin fibers and/or elastic fibers, wherein: structural fibers comprise glass, carbon, polymer, ceramic, metallic, mineral and/or natural fibers; and resin fibers comprise polyethylene terephthalate (PET), polyamide (PA), polyphenylene sulfide (PPS), polyphenylene oxide ether (PPE), polyethylenimine (PEI), polyether ether ketone (PEEK), fluoric polymers such as polytetrafluoroethylene (PTFE), ethylene-tetrafluoroethylene (ETFE), polyvinylidenefluoride (PVDF), and/or ethylene-tetrafluoroethylene (ETFE) based fibers.

In some embodiments, or in combination with any of the previous embodiments, the one or more structural reinforcement layers comprise braided fiber materials, knit fiber materials, woven fiber materials, and/or non-woven fiber materials.

In some embodiments, or in combination with any of the previous embodiments, the one or more structural reinforcement layers comprise polymeric films, metal films, metalized polymeric films, foils, fiber reinforced films and/or fiber reinforced foils.

In some embodiments, or in combination with any of the previous embodiments, the self-molding fiber cover comprises braided fiber materials, knit fiber materials, woven fiber materials, and/or non-woven fiber materials.

In some embodiments, or in combination with any of the previous embodiments, the self-molding fiber cover comprises structural fibers, resin fibers and/or elastic fibers, wherein: structural fibers comprise glass, carbon, polymer, ceramic, metallic, mineral and/or natural fibers; and resin fibers comprise polyethylene terephthalate (PET), polyamide (PA), polyphenylene sulfide (PPS), polyphenylene oxide ether (PPE), polyethylenimine (PEI), polyether ether ketone (PEEK), fluoric polymers such as polytetrafluoroethylene (PTFE), ethylene-tetrafluoroethylene (ETFE), polyvinylidenefluoride (PVDF), and/or ethylene-tetrafluoroethylene (ETFE) based fibers.

In some embodiments, or in combination with any of the previous embodiments, the one or more liquid polymer matrix solutions comprise a dispersion of ground thermoplastic polymer in an organic or non-organic solvent.

In some embodiments, or in combination with any of the previous embodiments, the one or more liquid polymer matrix solutions comprise one or more additives chosen from a group comprising surfactants, emulsifiers, dispersants, rheology modifiers, and functional additives.

In some embodiments, or in combination with any of the previous embodiments, the one or more liquid polymer matrix solutions comprise a thermoset polymer, wherein thermoset polymer comprises alkyd, amino, epoxy, phenolic, polyimide, polyurethane or silane polymers.

In some embodiments, or in combination with any of the previous embodiments, the one or more liquid polymer matrix solutions are configured to flow within and at least partially infuse the self-molding fiber cover to create a fiber-reinforced composite.

In some embodiments, or in combination with any of the previous embodiments, the one or more liquid polymer matrix solutions are configured to flow within and at least partially infuse the one or more structural reinforcement layers to form a multi-layer, fiber-reinforced composite.

In some embodiments, or in combination with any of the previous embodiments, composite insulation system further comprises one or more metal foil or fiber reinforced metal foil layers chosen from a group comprising aluminum, fiberglass reinforced aluminum, stainless steel, nickel, and tin.

In some embodiments, or in combination with any of the previous embodiments, the composite insulation system further comprises a customizable topcoat configured to be applied to the self-molding fiber cover, the customizable topcoat comprising one or more dry ground polymers dissolved in a solvent and an emulsifier.

In some embodiments, or in combination with any of the previous embodiments, heat is applied to cure the composite system into a rigid layered composite around the component.

In some embodiments, or in combination with any of the previous embodiments, the curing is configured to cause the one or more liquid polymer matrix solutions to flow between the one or more structural reinforcement layers and the self-molding fiber cover to create a mechanical and chemical bond between layers of the composite system.

In some embodiments, or in combination with any of the previous embodiments, the composite insulation further comprises a localized insulation mat positioned between the component and the one or more structural reinforcement layers, configured to be provide localized insulation to the component.

In some embodiments, or in combination with any of the previous embodiments, the composite insulation further comprises a localized insulation sleeve positioned between the component and the one or more structural reinforcement layers, configured to be provide localized insulation to the component.

In some embodiments, or in combination with any of the previous embodiments, the composite insulation further comprises a localized reinforcement layer, configured to prevent creation of gaps between the component and the one or more structural reinforcement layers due to differential thermal expansion.

In some embodiments, or in combination with any of the previous embodiments, the composite insulation further comprises a localized reinforcement layer, configured to be prevent localized abrasion of the component.

In some embodiments, or in combination with any of the previous embodiments, localized insulation layers may be installed to improve localized insulation properties. Localized insulation may be next to the pipe or duct, between other base layers or between a base layer and the cover. Localized insulation layers may be non-woven, woven, knit, braided or other fibrous material and may be any size less than complete pipe or duct coverage. Localized insulation may contain materials to aid in adhesion and or installation. Localized insulation may contain matrix or other additives.

In some embodiments, or in combination with any of the previous embodiments, there may be one more layers of foil or fiber-reinforced foil next to the structural element being covered. In high-temperature applications exposed to corrosive environments, this may reduce corrosion on the pipe or duct. This layer will have a very low void space that exhibits minimal expansion and contraction during heating and cooling which may minimize the transfer of fluids during thermal cycling. The foil layer may also provide a barrier between the object and matrix.

In some embodiments, or in combination with any of the previous embodiments, there may be layers of foil between other layers to improve insulation. The foil layer may also protect the insulation from wear due to system vibration.

In some embodiments, or in combination with any of the previous embodiments, external molding features can be molded into the system via molding plates applied prior to curing as required in the end application. External molding features may include flatted areas for clearance, holes for ports, and other features.

In some embodiments, or in combination with any of the previous embodiments, external molding features can be molded into the completed part after curing.

In some embodiments, or in combination with any of the previous embodiments, providing the composite insulation around a component comprises: providing one or more structural reinforcement layers, the one or more structural reinforcement layers being configured to conform to the component; providing a self-molding fiber cover comprising a spring-like structure configured to provide compression around the component; sliding the one or more structural reinforcement layers over the component; sliding the knit cover over the one or more structural reinforcement layers; securing the knit cover with one or more clamping devices; applying one or more liquid polymer matrix solutions to the one or more structural reinforcement layers and/or the self-molding fiber cover positioned on the component; and curing the composite insulation system at a predetermined temperature.

In some embodiments, or in combination with any of the previous embodiments, a conforming, fiber-reinforced composite insulation system that is configured to be applied to a component comprises: one or more structural reinforcement layers, the one or more structural reinforcement layers being configured to provide structural support, insulation or protection to the component; and one or more liquid polymer matrix solutions configured to be applied to the one or more structural reinforcement layers positioned on the component to form the fiber-reinforced composite insulation system.

In some embodiments, or in combination with any of the previous embodiments, a conforming, fiber-reinforced composite insulation system that is configured to be applied to a component comprises: a self-molding fiber cover comprising a spring-like structure configured to provide compression around the component; and one or more liquid polymer matrix solutions configured to be applied to the self-molding fiber cover positioned on the component to form the fiber-reinforced composite insulation system when cured.

In some embodiments, or in combination with any of the previous embodiments, the composite insulation system that is configured to be applied to a component comprises: a braided tape, the braided tape being configured to conform to the component; a self-molding fiber cover comprising a spring-like structure configured to provide compression around the component; and one or more composite matrix solutions configured to be applied to the braided tape and/or the self-molding fiber cover positioned on the component to form the composite insulation system.

In some embodiments, or in combination with any of the previous embodiments, the braided tape comprises at least one of glass fibers, thermoplastic fibers, and elastic fibers.

In some embodiments, or in combination with any of the previous embodiments, the braided tape is configured to wrapped around the component such that the braided tape forms an abutment with at least a portion of an adjacent braided tape, wherein the abutment is a tight junction.

In some embodiments, or in combination with any of the previous embodiments, the braided tape is configured to wrapped around the component and secured without external clamps.

In some embodiments, or in combination with any of the previous embodiments, the braided tape is configured to be opened to receive flanges in the component.

In some embodiments, or in combination with any of the previous embodiments, the braided tape comprises elastic longitudinal tows and inelastic oblique tows.

In some embodiments, or in combination with any of the previous embodiments, the braided tape is a fiber based substrate comprising interweaving multiple fibers, at least one fiber selected from a group comprising e-glass, s-glass, basalt, quartz, polytetrafluoroethylene (PTFE), meta-aramid, para-aramid, melamine, polybenzimidzole, polyimide, silica, oxidized polyacrylonitrile, carbon fiber, and/or ceramic.

In some embodiments, or in combination with any of the previous embodiments, the composite matrix comprises vermiculite, colloidal silica, potassium silicate, bitumen, calcium aluminate.

In some embodiments, or in combination with any of the previous embodiments, the composite matrix comprises one or more additives selected from a group consisting of thermoplastic polymers, thermoset polymers.

In some embodiments, or in combination with any of the previous embodiments, the composite matrix comprises a biocide.

In some embodiments, or in combination with any of the previous embodiments, the composite matrix is incorporated into the braided tape prior to wrapping the component.

In some embodiments, or in combination with any of the previous embodiments, producing a composite insulation system for a component comprises: providing a braided tape, wherein the braided tape configured to conform to the component; wrapping the braided tape around the component such that the braided tape forms an abutment with at least a portion of an adjacent braided tape wrap, wherein the braided tape and the adjacent braided tape wrap do not overlap; wrapping and tucking ends of the braided tape into adjacent wraps of the braided flat tape; and applying a composite matrix to at least a portion of the braided flat tape.

In some embodiments, or in combination with any of the previous embodiments, the composite insulation system is repairable. As such, if the system becomes worn, torn, or the like, it may be easily repairable without replacing the composite insulation. Furthermore, the self-molding composite system may act as a repair for damage to any type of insulation or covering system. In this way, a repair mixture may be provided to the installer or end-user to complete a repair. The mixture may be a thermoplastic or thermoset polymer solution. Thermoplastic systems may include one or more dry ground polymers in crystalline or semi-crystalline form dissolved or otherwise dispersed in an inorganic or organic solvent. Additives may be included in the repair mixture in order to produce a repair that is both physically and esthetically acceptable. Additives may include any of the matrix additives. In this way, the installer or end-user may be able to apply the repair mixture by brush, roller, trowel, spray, or the like such that the repair mixture fills and covers the damaged area of the system. Once the repair mixture has been applied, heat may be applied to cure the repair mixture. The heat may be applied via heat gun, oven, or the like. During curing the repair mixture may flow into the various layers of the insulator and fuse them together to patch the damage created to the insulator.

In some embodiments, the composite system is configured to insulate automotive, recreational vehicle and industrial pipe and exhaust systems. As such, the system may help retain the internal heat of the pipe's contents. Furthermore, the system may protect surrounding components from the extreme temperatures of the pipes, while also protecting the pipe form rust, corrosion, and damage. The insulation applications may include exhaust insulation covers, pipe insulation covers, machinery or engine covers (such as turbine covers), gun barrel covers, and the like.

In some embodiments, the composite insulation system may also be used in structural applications where the composite system is used to add to or carry the structural load of the system. In these applications the internal mold may remain or be removed after processing. Examples of this application include pipe reinforcement of low strength pipes such as ductwork, HVAC ducting, fluid transfer pipes and cooling tubes.

In some embodiments, the composite system is used to insulate industrial pipes and ducts that carry hot or cold fluids to retain heat, insulation from heat and protect workers and the environment. Fluids can include liquids, gases and mixtures of either and mixtures of either or both with solids.

As one of ordinary skill in the art appreciates, any combination of the one or more layers of the composite system may be utilized based on application requirements, such as thermal qualities, breathability, abrasion qualities, appearance, or the like desired based on the insulation and/or covering operations being performed. The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
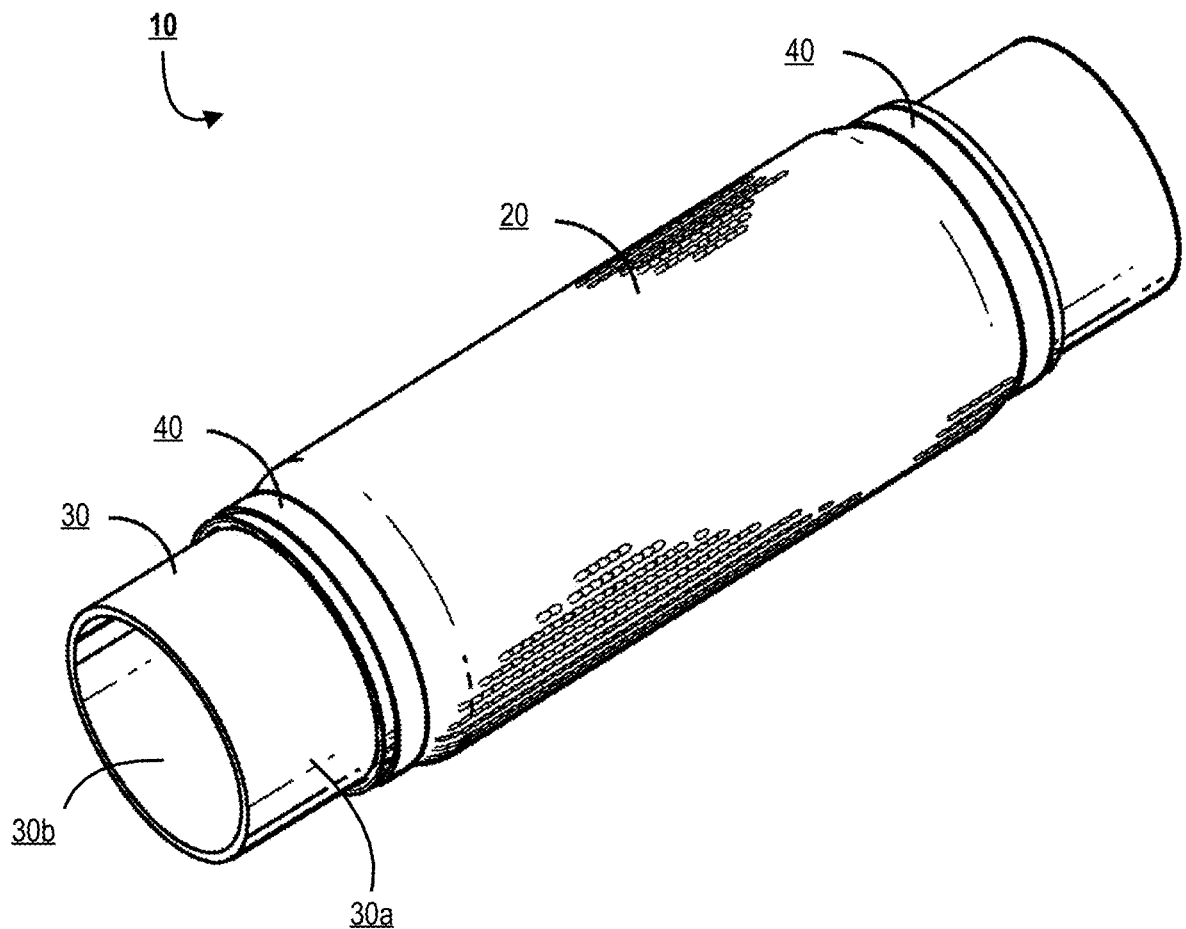
Figure 2:
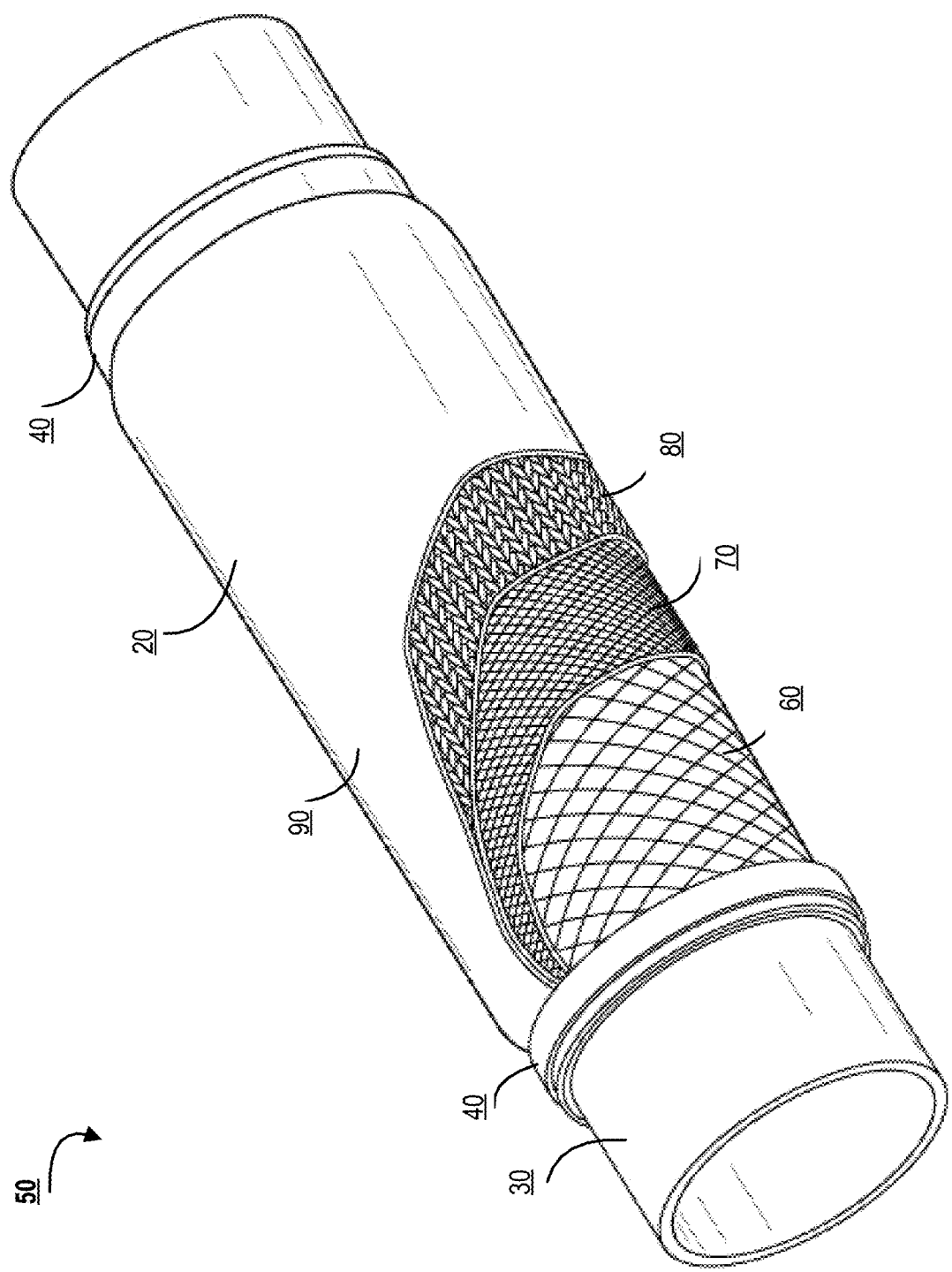
Figure 3:
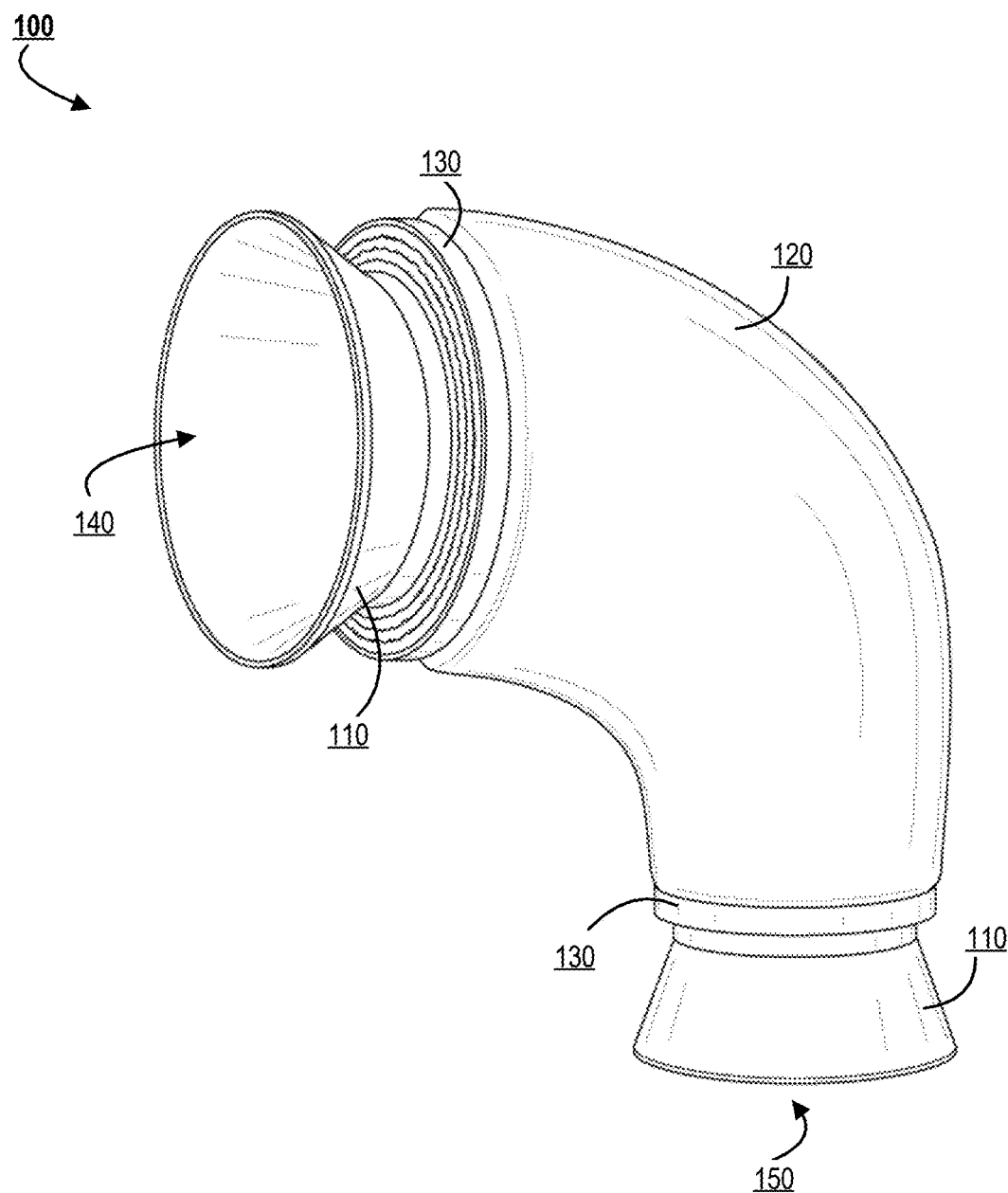
Figure 4:
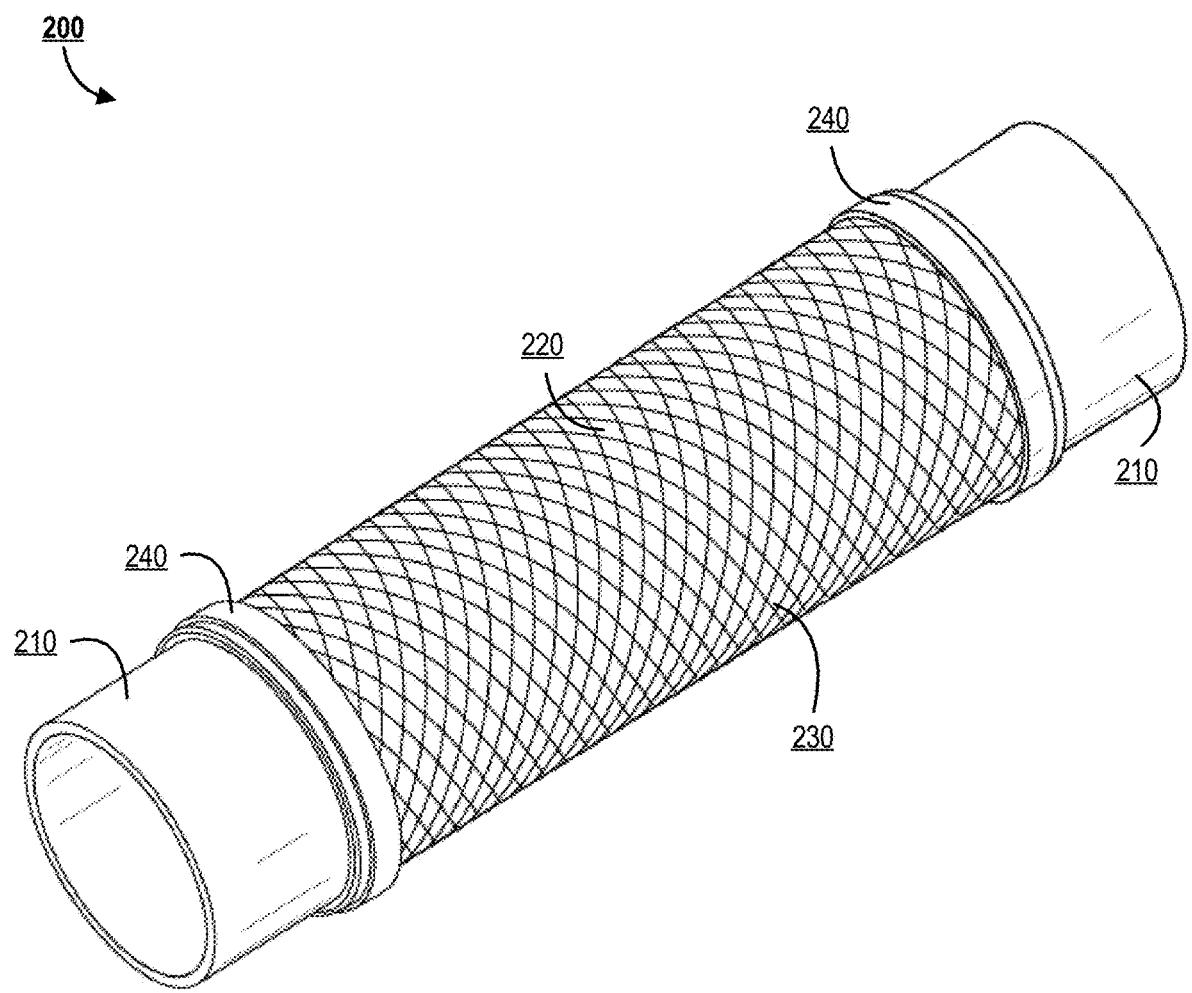
Figure 5:
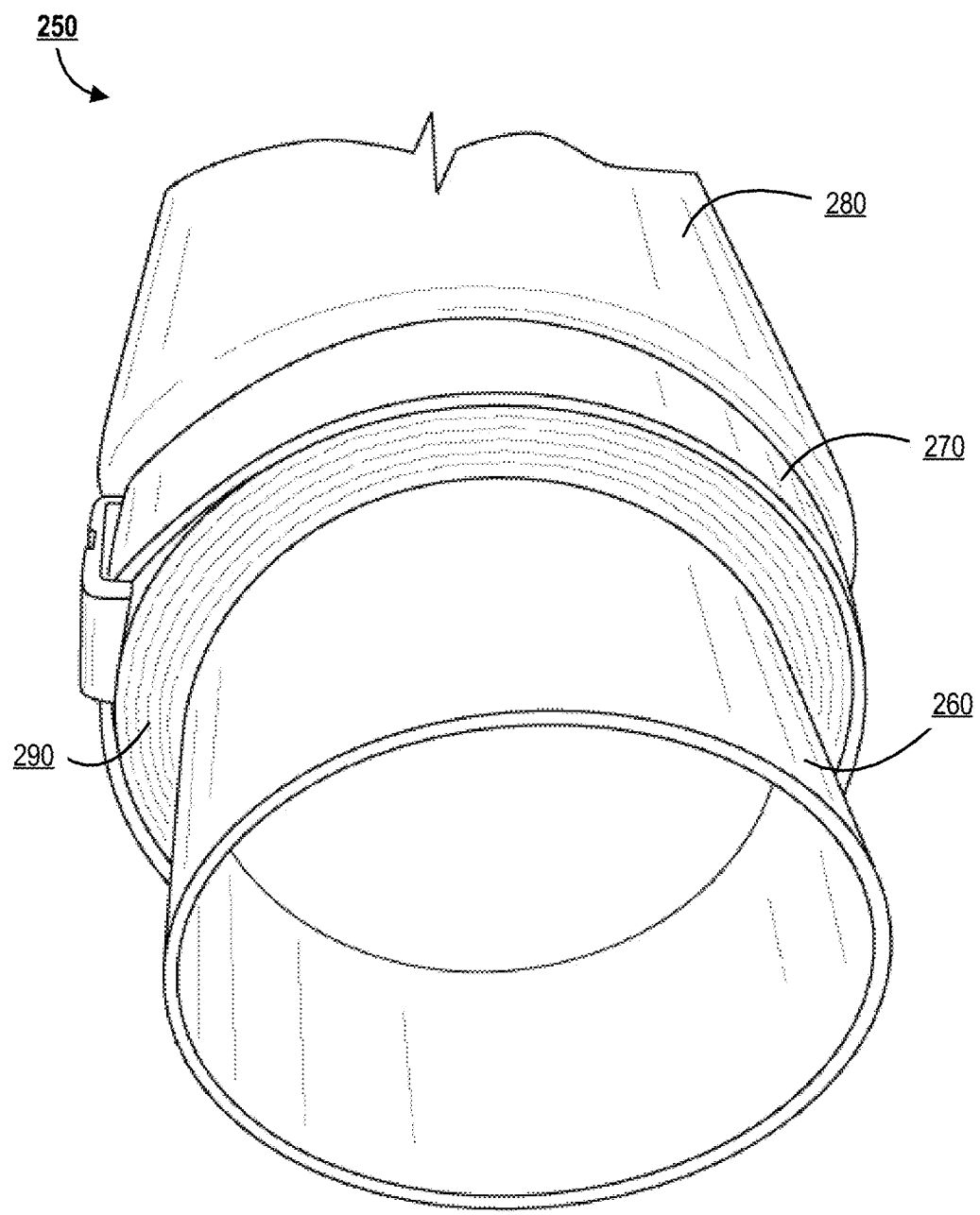
Figure 6A:
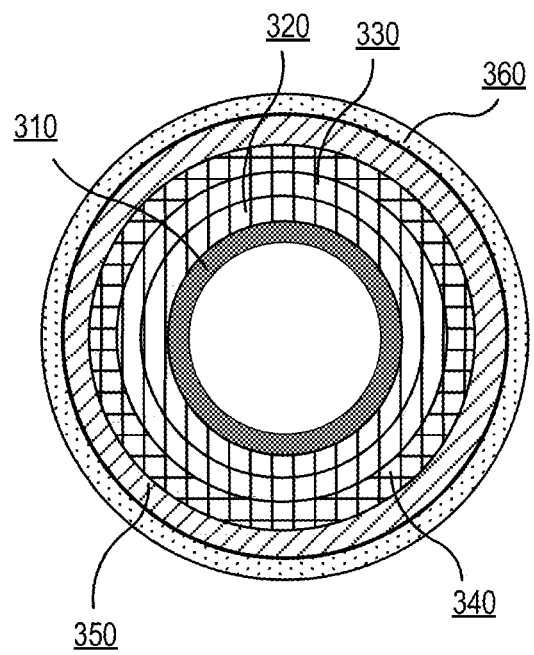
Figure 6B:
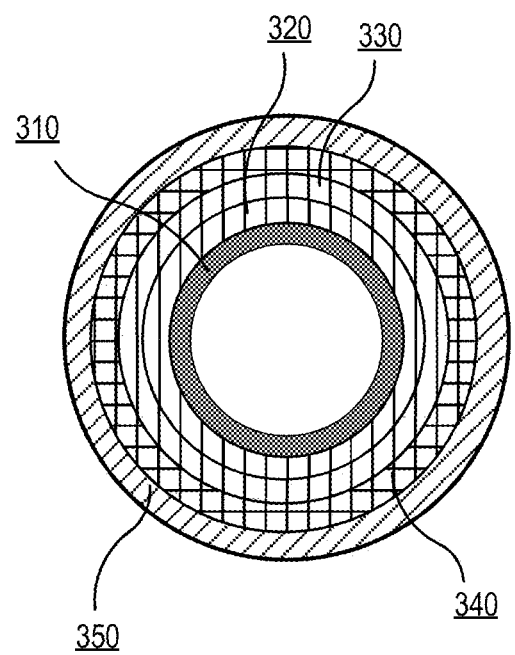
Figure 6C:
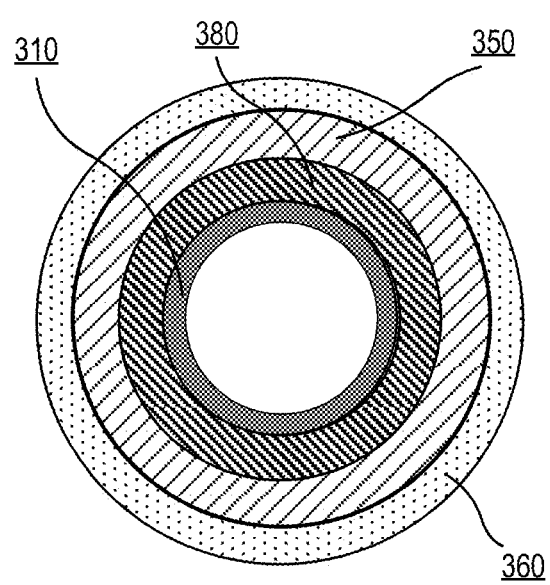
Figure 6D:
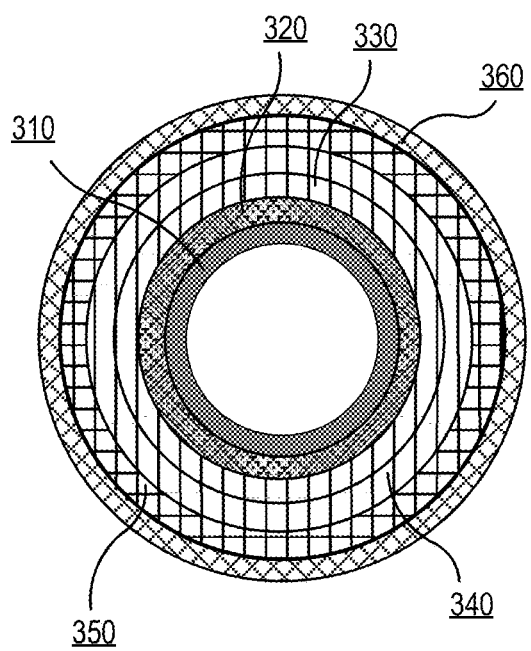
Figure 7:
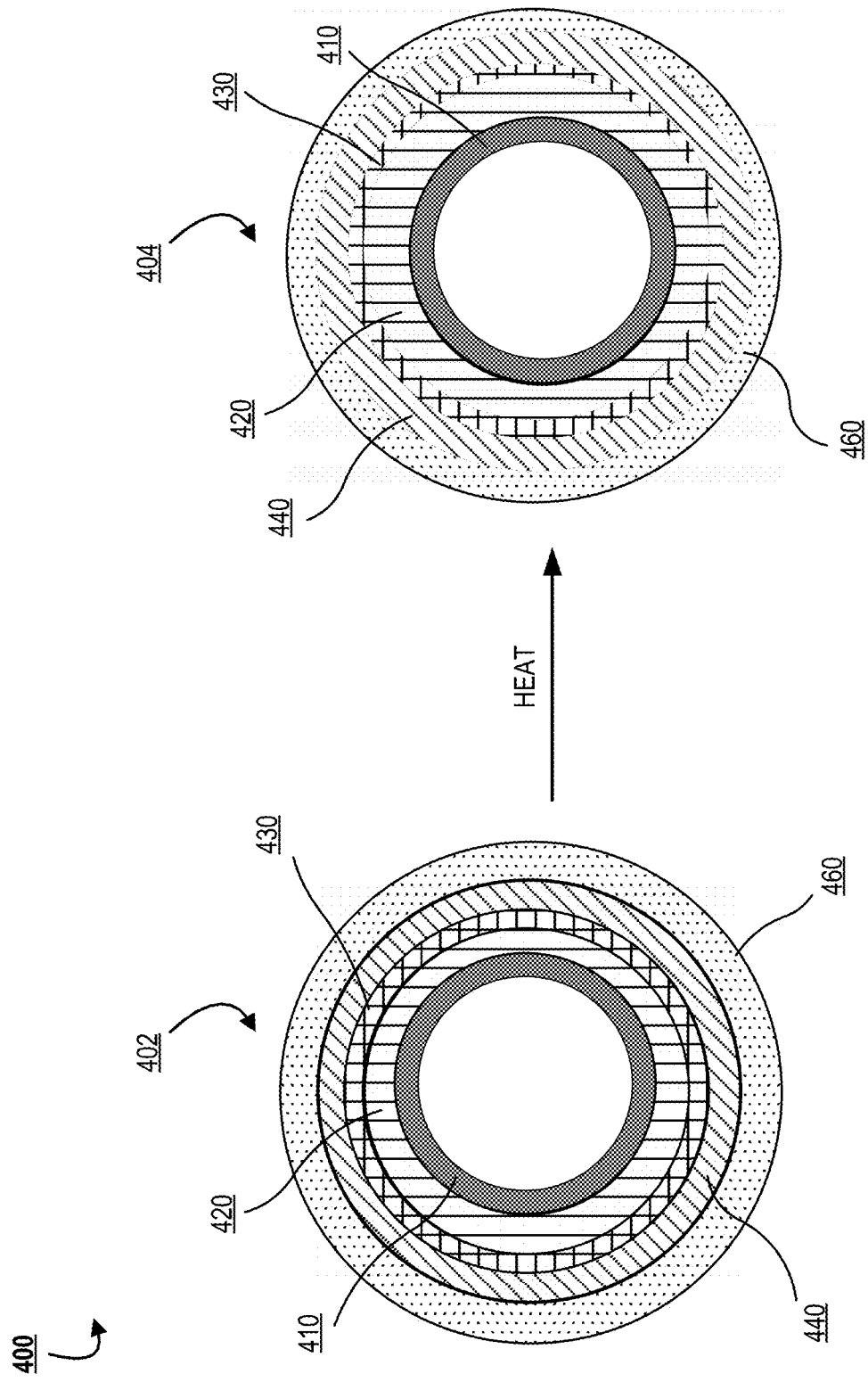
Figure 8:
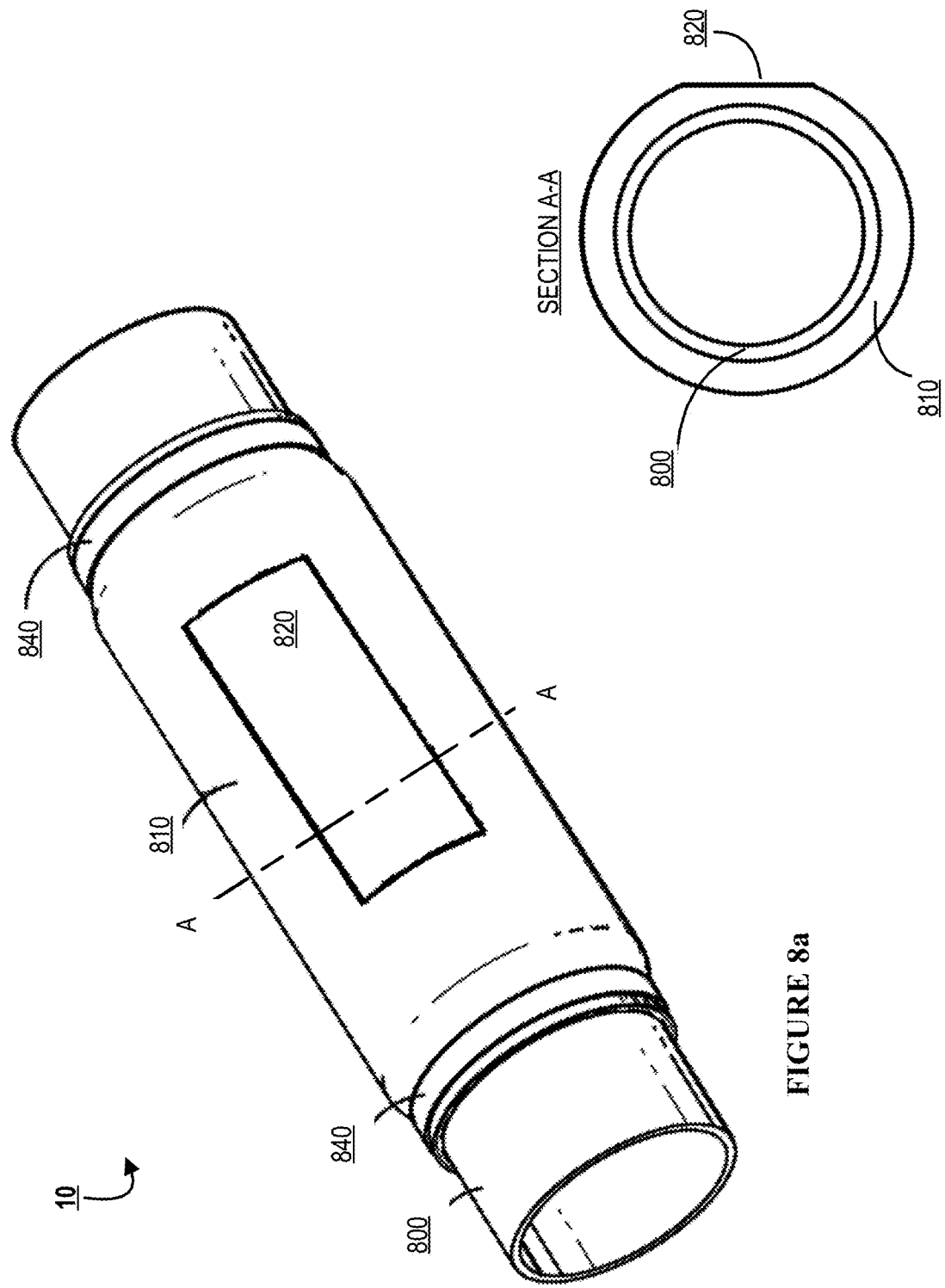
Figure 9:
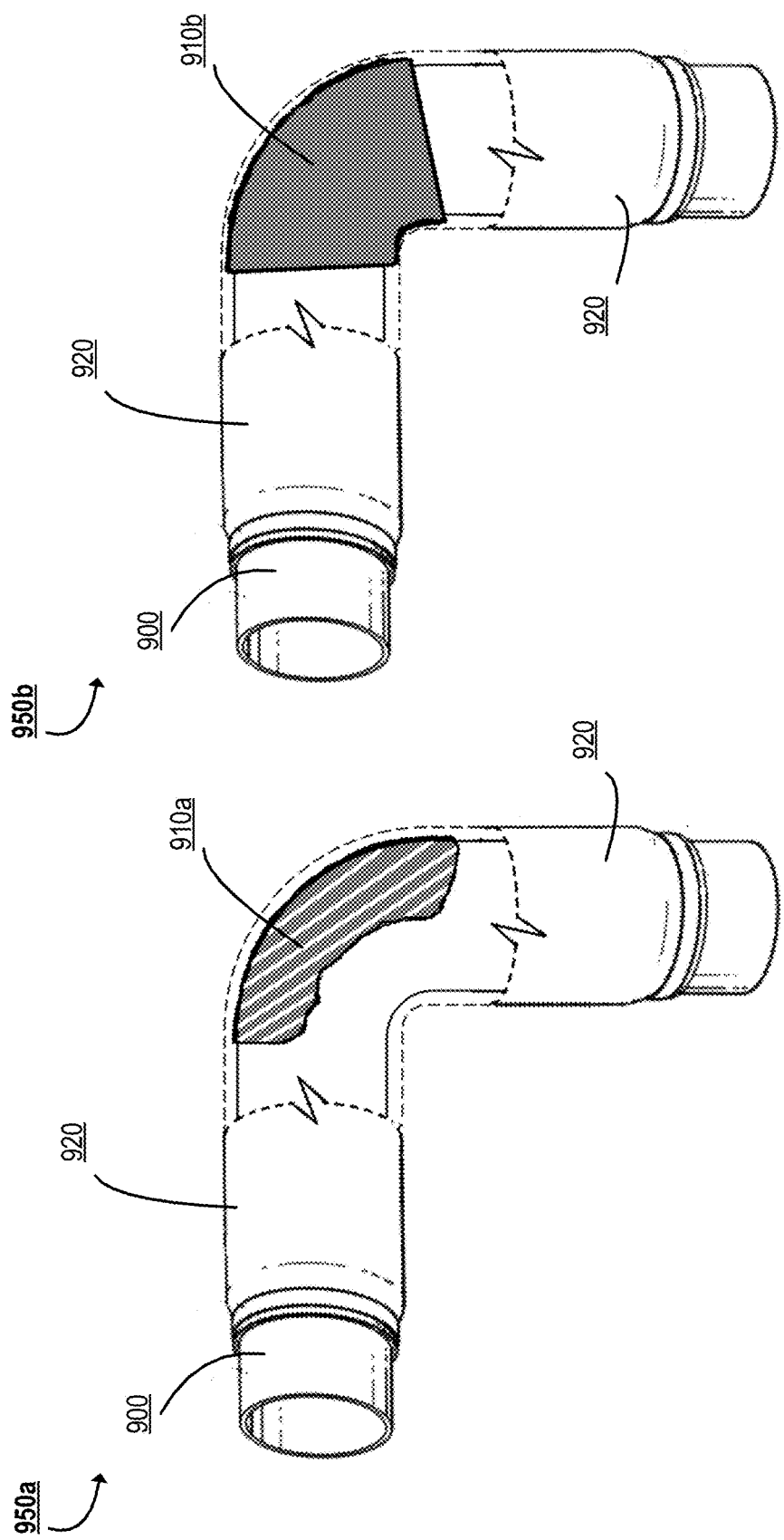
Figure 10:
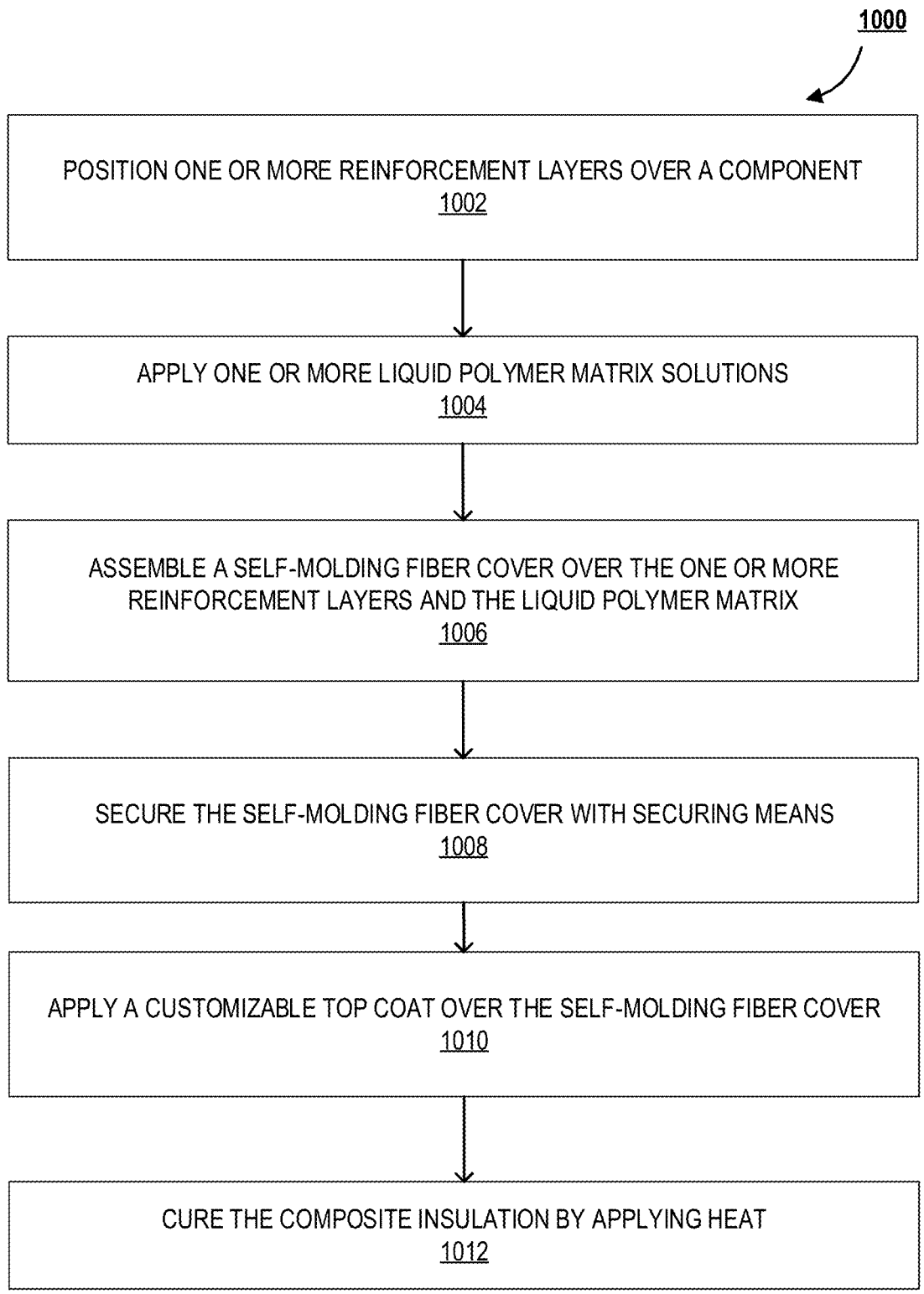
Figure 11:
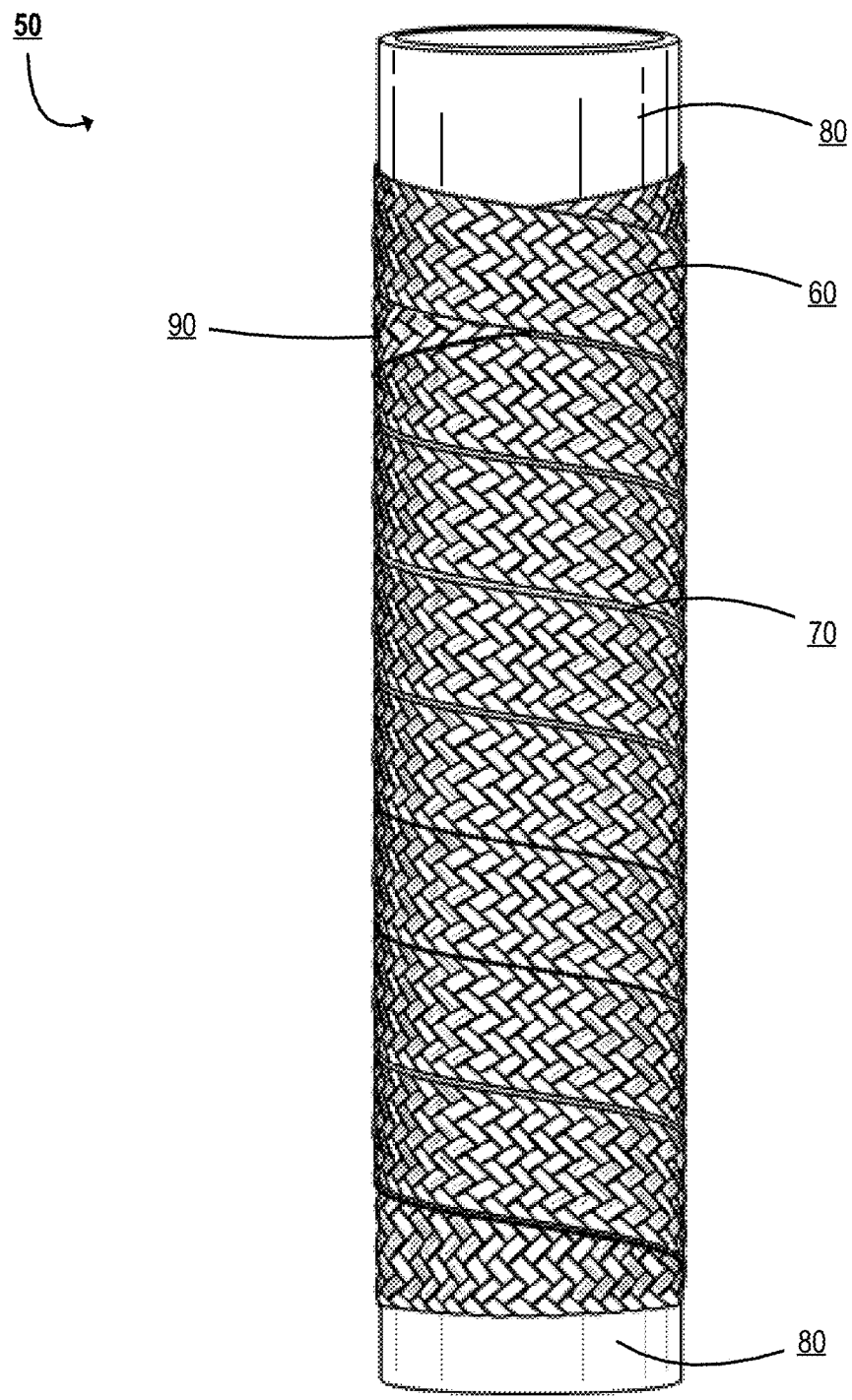
Figure 12:
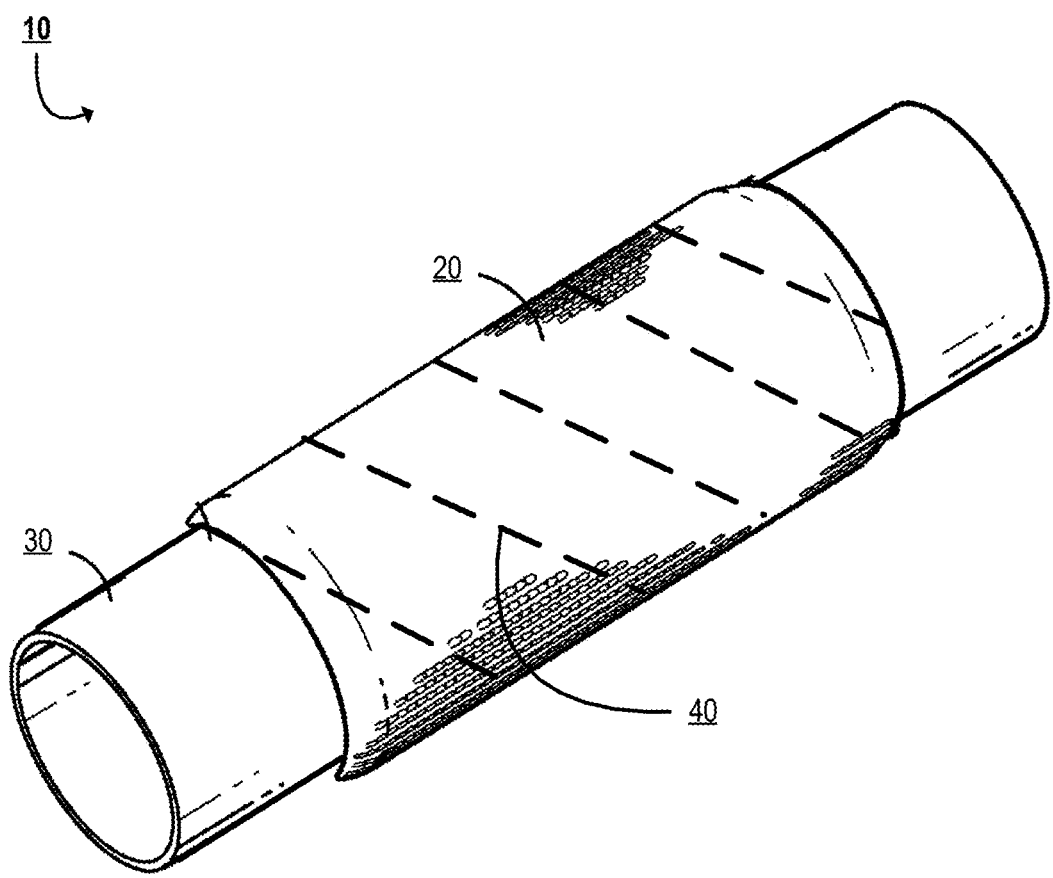
Figure 13A:
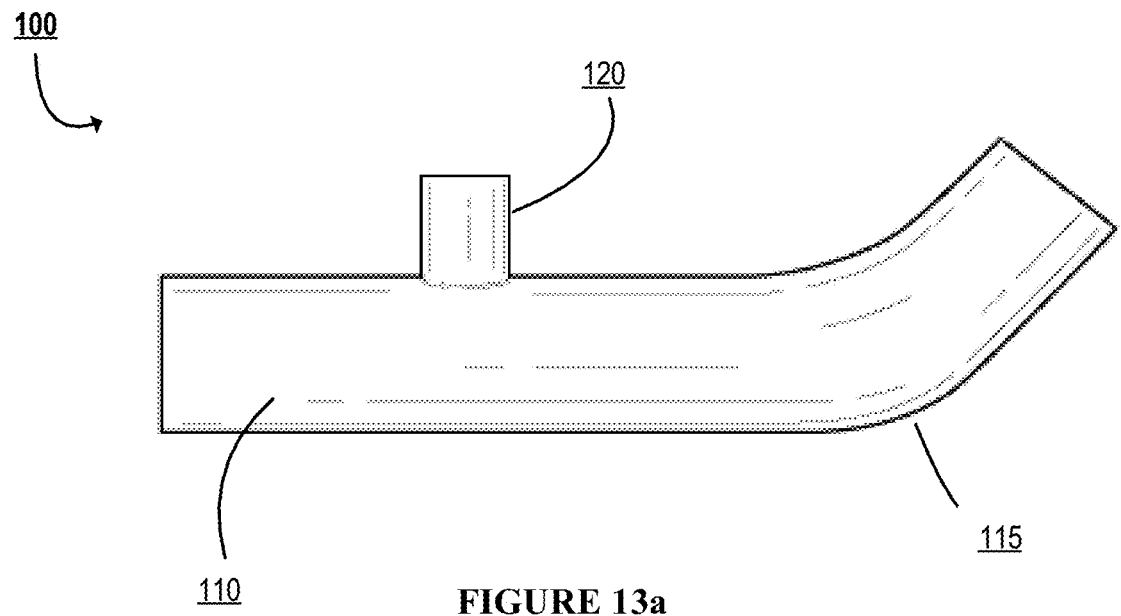
Figure 13B:
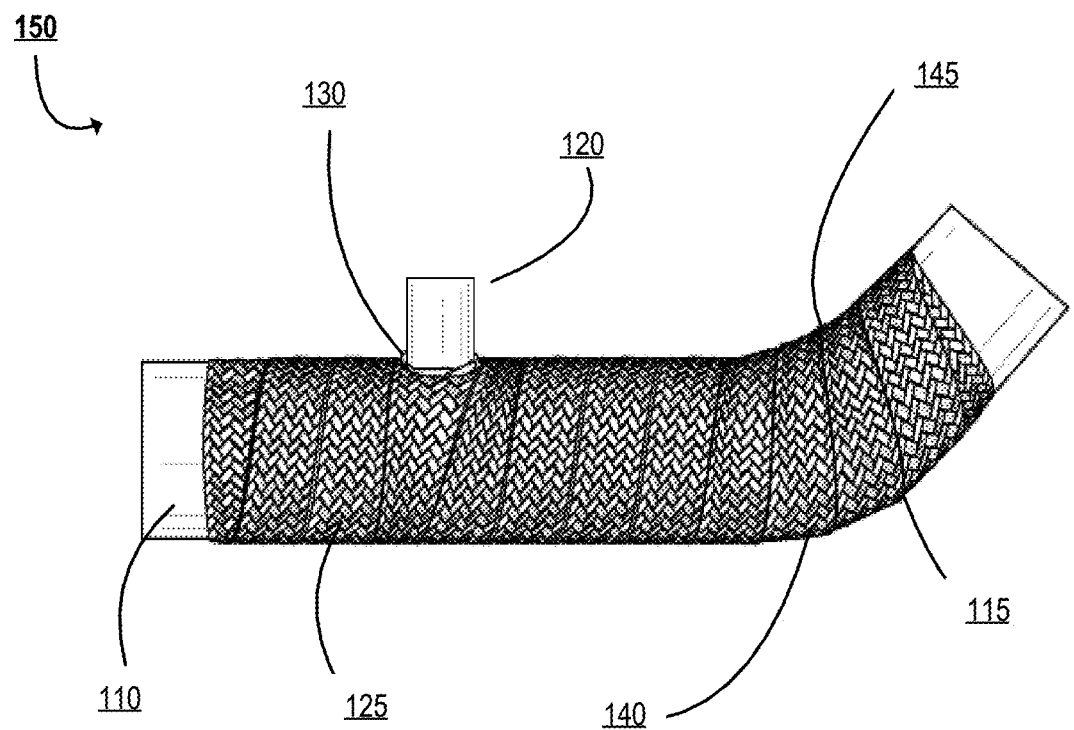
Figure 13C:
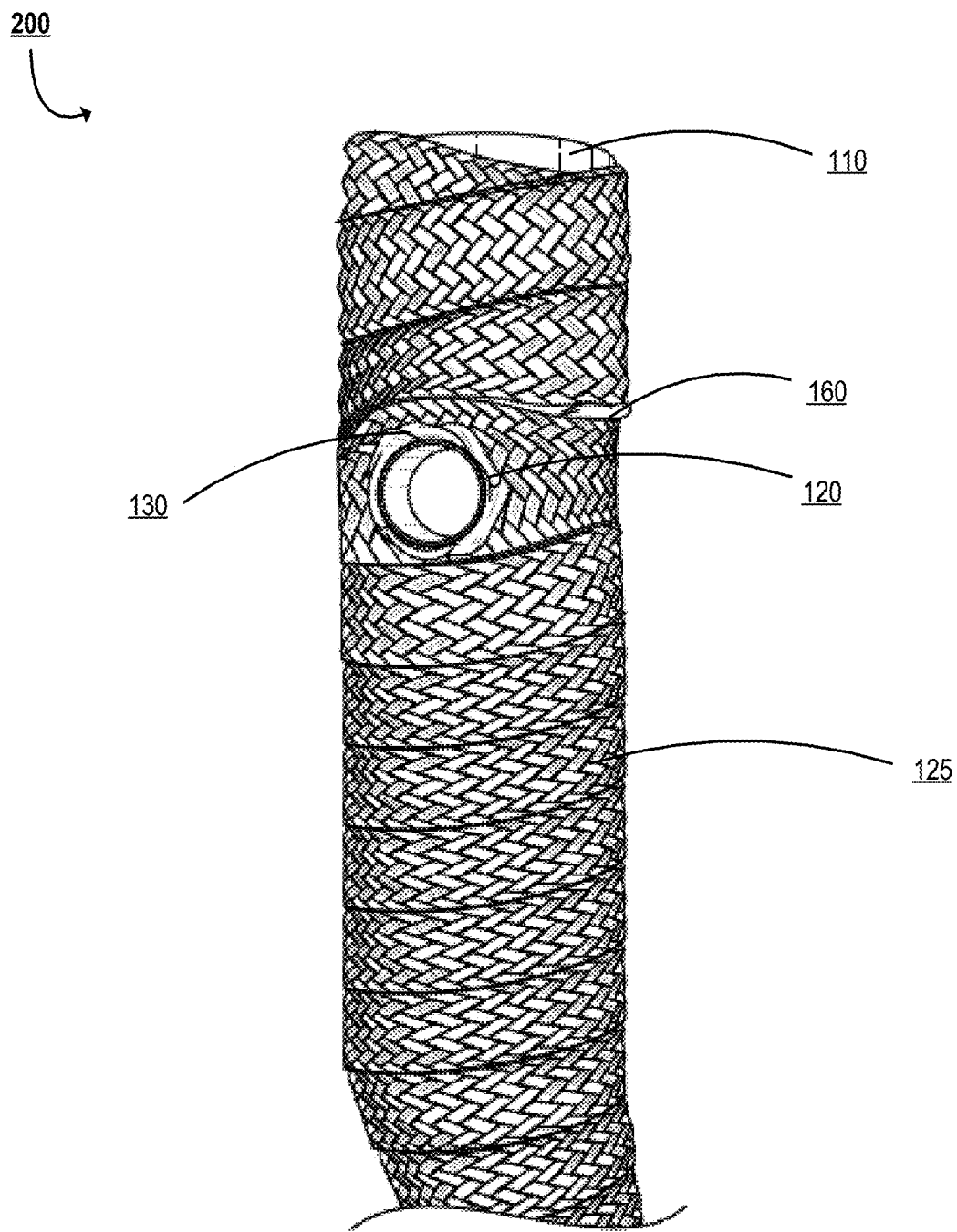
Figure 14:
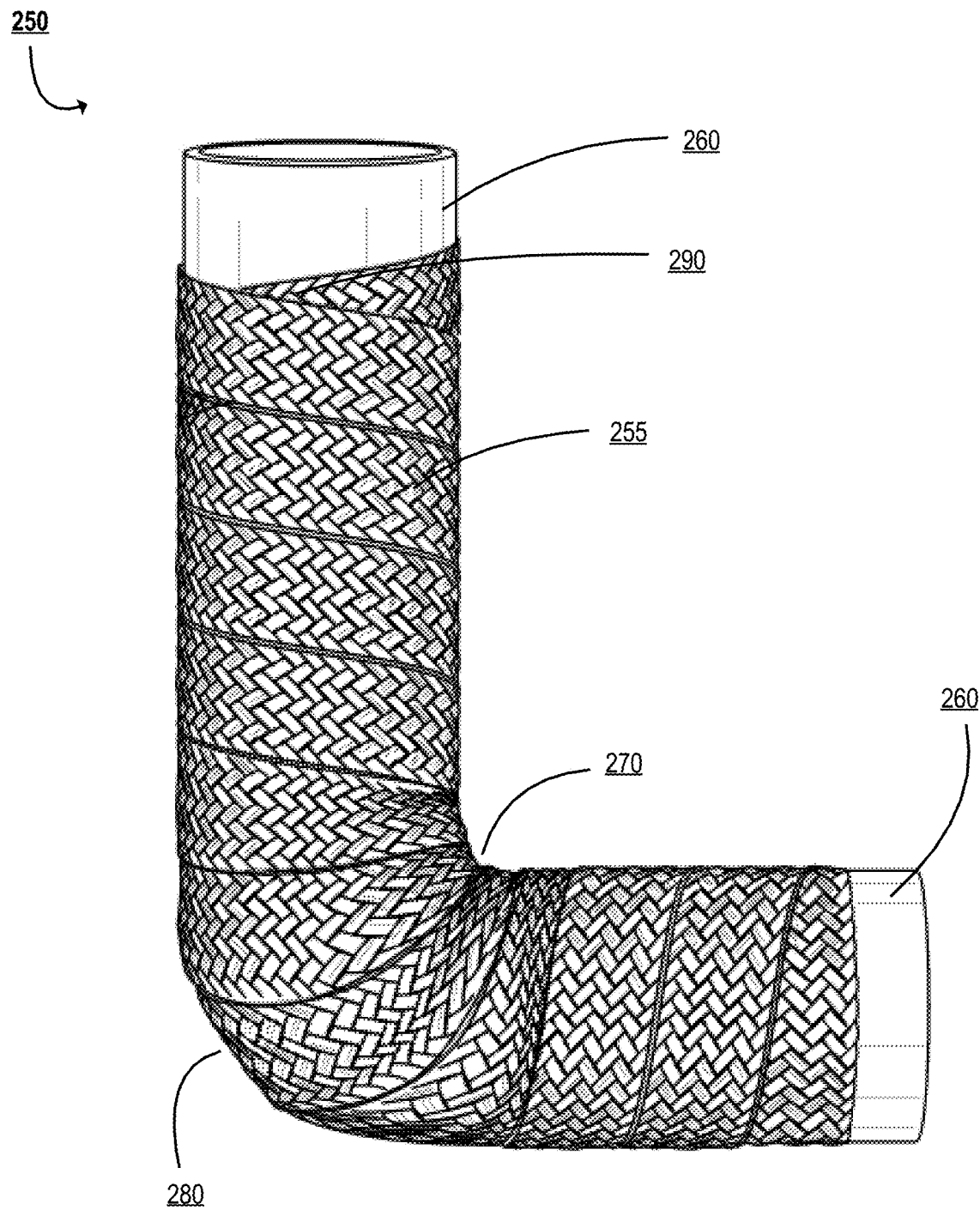
Figure 15C:
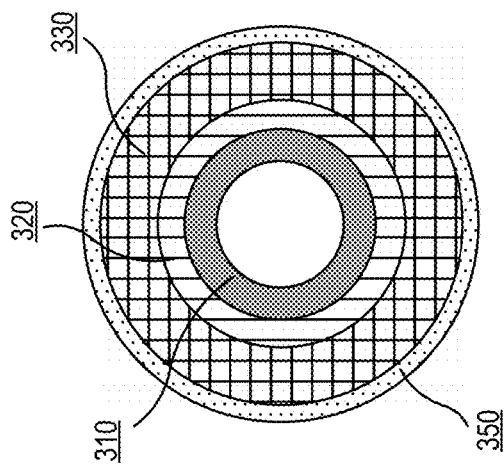
Figure 15F:
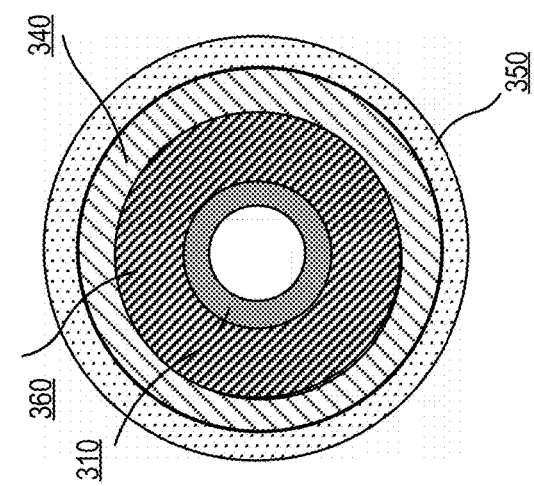
Figure 15B:
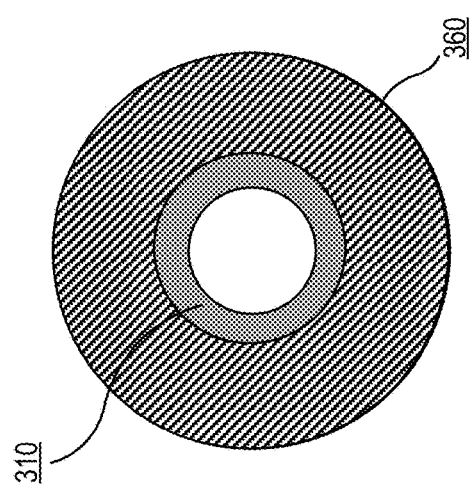
Figure 15E:
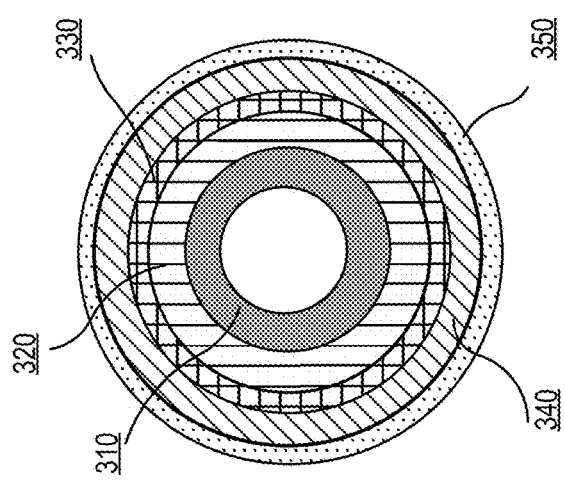
Figure 15A:
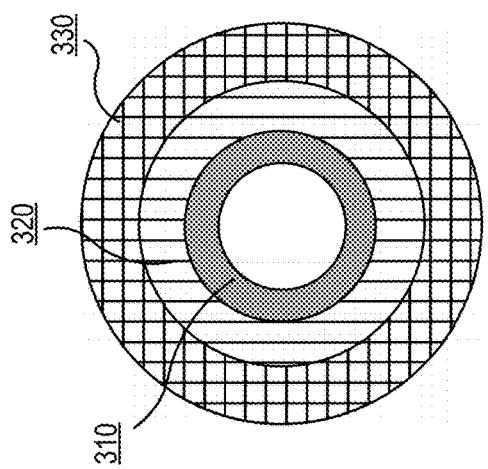
Figure 15D:
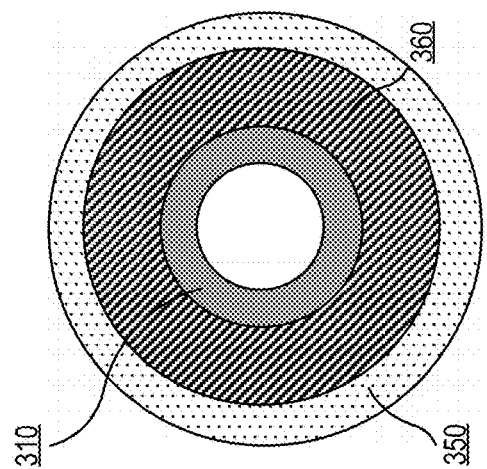
Figure 16:
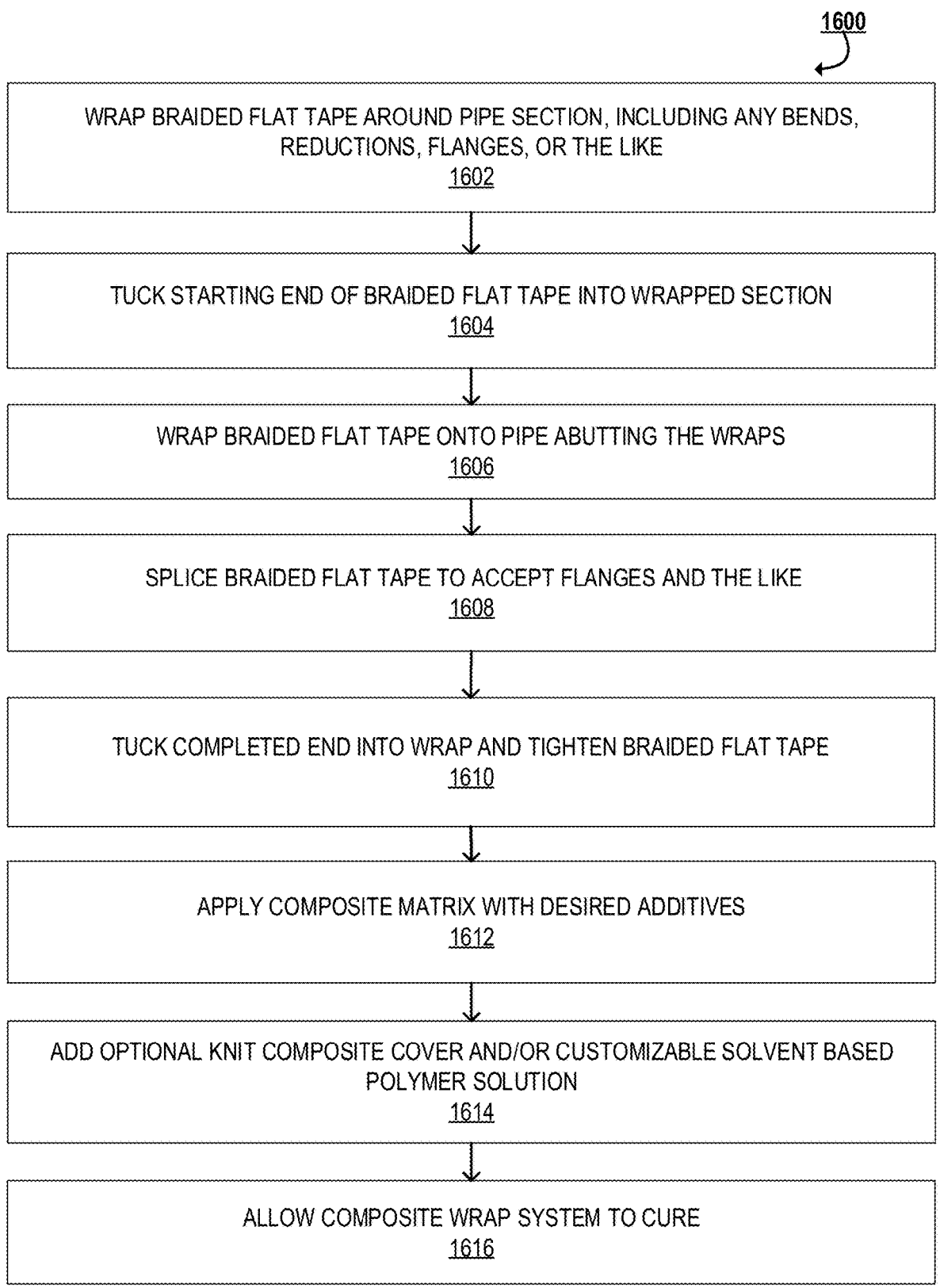

Having thus described embodiments of the invention in general terms, reference will now be made the accompanying drawings, wherein:

FIG. 1 illustrates a perspective view of a composite insulation system, in accordance with various embodiments of the invention;

FIG. 2 illustrates a perspective cut-away view of a composite insulation system with an interfacial layer and topcoat, in accordance with various embodiments of the invention;

FIG. 3 illustrates a perspective view of a composite insulation system around a reduction pipe, in accordance with various embodiments of the invention;

FIG. 4 illustrates a perspective view of a composite insulation system with a braided cover, in accordance with various embodiments of the invention;

FIG. 5 illustrates an end view of a composite insulation system with a clamp, in accordance with various embodiments of the invention;

FIG. 6a illustrates a cross-sectional view of a composite system, in accordance with various embodiments of the invention;

FIG. 6b illustrates a cross-sectional view of a composite system, in accordance with various embodiments of the invention;

FIG. 6c illustrates a cross-sectional view of a composite insulation system, in accordance with various embodiments of the invention;

FIG. 6d illustrates a cross-sectional view of a composite insulation system, in accordance with various embodiments of the invention;

FIG. 7 illustrates a cross-sectional view of the curing process of a composite system, in accordance with various embodiments of the invention;

FIG. 8a illustrates a perspective view of a self-molding, fiber reinforced composite system, in accordance with various embodiments of the invention;

FIG. 8b illustrates a cross-sectional view of the self-molding, fiber reinforced composite system of FIG. 8a;

FIG. 9a illustrates a cut-away view of a composite insulation system, in accordance with various embodiments of the invention; and FIG. 9b illustrates a cut-away view of a composite insulation system, in accordance with various embodiments of the invention;

FIG. 10 illustrates a process flow for a method of applying a composite system, in accordance with various embodiments of the invention;

FIG. 11 illustrates a perspective view of a composite wrap system, in accordance with various embodiments of the invention;

FIG. 12 illustrates a perspective view of a composite wrap system, in accordance with various embodiments of the invention;

FIG. 13a illustrates a perspective view of a component prior to being wrapped with the composite wrap system, in accordance with various embodiments of the invention;

FIG. 13b illustrates a perspective view of a composite wrap system being applied around a flange, in accordance with various embodiments of the invention;

FIG. 13c illustrates an alternative view of a composite wrap system being applied around a flange, in accordance with various embodiments of the invention FIG. 14 illustrates a perspective view of a composite wrap system, in accordance with various embodiments of the invention;

FIG. 15a illustrates a cross-sectional view of a composite wrap system, in accordance with various embodiments of the invention;

FIG. 15b illustrates a cross-sectional view of a composite wrap system, in accordance with various embodiments of the invention;

FIG. 15c illustrates a cross-sectional view of a composite wrap system, in accordance with various embodiments of the invention;

FIG. 15d illustrates a cross-sectional view of a composite wrap system, in accordance with various embodiments of the invention;

FIG. 15e illustrates a cross-sectional view of a composite wrap system, in accordance with various embodiments of the invention;

FIG. 15f illustrates a cross-sectional view of a composite wrap system, in accordance with various embodiments of the invention; and FIG. 16 provides a process flow illustrating the method of applying a composite wrap system, in accordance with various embodiments of the invention.

DETAILED DESCRIPTION OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Fiber reinforced composite fabrication, such as for fiber reinforced pipes, typically involves wetting, mixing or saturating the fibers with the matrix, compacting, forming and curing the composite. Fibers are the discontinuous phase of a fiber-reinforced composite. Matrix is the continuous phase and often based on polymeric materials. Wetting, mixing or saturating the fibers with matrix can be done by a number of methods including applying the material prior to compacting or during compacting or forming. Fiber reinforced composite systems are typically formed to shape and compacted using an external mold that is typically not reusable. In these applications, a mold of the desired shape is required to be pre-made. The fiber and resin are introduced into the molding system and through, chemical reaction, heat and or pressure the fiber reinforced composite part is formed. Typically, this is done through vacuum bag, autoclave, resin transfer or compression molding.

In fiber reinforced composite molding, the two parts of the mold as often referred to as the lower mold and the other as the upper mold. In some applications, the two parts of the mold as often referred to as an internal and external mold. Lower and upper and internal and external do not necessarily describe the molds configuration, but are used to denote different faces. In molding a tubular part, one may have a cylindrical mandrel as the lower mold and a rigid upper mold to form the fiber reinforced composite to the shape of the mandrel.

Vacuum bag molding of a shaped part typically requires a rigid lower mold and uses a flexible, air impermeable film system as the upper mold. The system is sealed air-tight and a vacuum is draw to create pressure to consolidate the composite during curing.

Autoclave molding uses both a rigid upper and lower mold with each part producing one face of the molded part. In the process the fiber reinforcement and matrix is placed between the mold plates and a vacuum is drawn. Typically heat and pressure are used to cure the part.

Resin Transfer Molding (RTF) uses both a rigid upper and lower mold. In RTF molding, the fiber reinforcement is placed in the mold and the mold is closed. The matrix is injected into the closed mold and the part is cured.

Compression molding is a forming process where a plastic material is placed directly into a heated metal mold, is softened by the heat, and forced to conform to the shape of the mold as the mold closes. The compression molding starts, with an allotted amount of plastic or gelatin placed over or inserted into a mold. Afterward the material is heated to a pliable state in and by the mold. Shortly thereafter a hydraulic press compresses the pliable plastic against the mold, resulting in a molded piece, retaining the shape of the inside surface of the mold. Compression molding is a high-volume, high-pressure method suitable for molding complex, high-strength fiberglass reinforcements.

While a high degree of compression during molding can create a highly consolidated composite with minimal void to maximize strength, this is not always desirable. In some cases, an acceptable level of performance can be achieved without a high degree of consolidation and other attributes such as cost, manufacturing complexity and time can be minimized. In applications where thermal or sound insulation are desirable, a higher level of void volume may actually be preferred. Historically, fiber reinforced composites have been limited to high volume and or high cost applications. The cost of molding equipment must either be recovered through a large volume of parts or through high costs for low volume parts.

Fiber reinforced composites are configured to be used as both piping and as reinforcement to conventional plastic and metal piping. Fiber reinforced composite pipes can be produced via conventional molding techniques and pultrusion. Conventional pipes are most commonly reinforced with wrappable fiber reinforced composites.

Pultrusion is a continuous molding process whereby reinforcing fibers are saturated with liquid polymer resin and formed and pulled through a heated die for form a continuous part such as pipe.

Metal stamping is a process in which a flat or rolled sheet of metal is placed in a stamping press where a tool and die surface are pressed together to form the sheet metal into the desired shape. Metal stamping is typically used to form metal foil covers used in insulating pipes and ducts.

Each of these molding operations requires special equipment and manufacturing capabilities, such as molds, compression equipment, or vacuum equipment and they typically require unique parts (such as molds of specific dimensions) for each product produced. In this way, each different exhaust pipe configuration requires a unique set of molds at a significant tooling cost each. In addition, each time the configuration changes a new set of molding plates must built.

Furthermore, the methods currently used in exhaust systems have various limitations. For example, insulation covers tend to rip or fray easily if caught. Resin fiber processing precludes inclusion of additives, such as pigments and the like. Resin fiber rheology is limited to that of the resin fiber production process. Moreover, the amount of resin that can be used to stabilize and strengthen the system is limited by resin fibers.

Therefore, it would desirable to provide a mass customizable, pipe insulation system that allows simple application to various pipe geometries, easy customization as to the type and level of insulation provided, easily provides the opportunity for variable insulation along the pipe, allows for easy modification of matrix types and distribution within the insulation system, provides for the simple addition of topcoats, is simple to secure to the pipe and curable without the use of external molds.

The embodiments presented herein are directed to composite insulation configured for use as insulation, structural support, covering and/or protection means for one or more components. "Component(s)" as used herein may refer to a machine part, a structural member, or another mechanical component or system that entails insulation, structural support/reinforcement, or covering, and the like. In some embodiments, the component is a hollow tubular member, such as a pipe, a duct, a hose, a cylindrical/tubular section, a hollow member with a suitable cross-section and a straight/curvilinear axis, a fitting member used in piping assemblies, valves utilized in piping assemblies, or the like. In some embodiments, the component (for example, a hollow tubular member) is configured to transport, carry, convey, direct, control and/or regulate flow of fluids (for example, liquids, gases, slurries, fluidized solids and the like). In some embodiments, the component may refer to transfer pipes or ducts, heating and cooling lines, fluid supply lines and steam lines configured for use in industrial/domestic applications and heating/cooling systems. As an example, the component may be a pipe or a pipe assembly/fitting component configured for transport and/or retention of fluid in an industrial application or in a building. In some embodiments, the component is a part of exhaust systems, engine cooling tubes, air intake systems and other automotive applications. In this regard, in some embodiments, the component is an exhaust component, such as an exhaust pipe that typically comprises a hollow tubular member or a pipe configured to facilitate transport of exhaust gases from one location to another.

In some embodiments, the composite insulation system, as used herein, may comprise a composite insulation comprising a cover, a wrap, a sleeve or the like, that is typically configured to be provided on or around one or more components (for example, around at least a portion of an outer surface of one or more components). In some embodiments, the composite insulation system, as used herein, may refer to an assembly comprising composite insulation provided on a component, typically resulting in an insulated component. In this regard, the composite insulation system may refer to the insulated component either, before, during, or after assembly and/or prior to, during or after treatment/processing/curing of the composite insulated provided on the component. In some embodiments the composite insulation system may refer to the composite insulation that is configured to be provided on a component requiring insulation. Insulation, as used herein, may refer to thermal insulation of the component, structural support/reinforcement of the component, covering of one or more surfaces of the component for protecting the component from ambient environment/operating conditions, coverings for energy consumption optimization, acoustic insulation and/or electrical insulation. Typically, the composite insulation system finds applications in thermal insulation for regulating thermal conduction, thermal radiation or heat transfer in general between the component and the surroundings, and/or between the fluid transported or conveyed by the component and the surroundings or the component itself.

The composite insulation system as described herein may be used in a variety of applications and on a variety of components, including exhaust insulation covers, pipe insulation covers, machinery or engine covers (such as turbine covers), rigid fire barrier panels, gun barrel covers, heat curable composite textile fabrics, patches associated with the above, and/or the like. The composite insulation systems may be configured to insulate automotive, industrial, residential, recreational vehicle piping and ducting. Automotive applications of the composite insulation system include exhaust systems, engine cooling tubes and air intake systems. Here, insulation may be used on exhaust systems in order to maintain high temperature of exhaust gases for efficient combustion, to maintain heat for the efficient operation of internal emission systems, to protect surrounding/proximate components and/or to protect persons that may come in contact with pipes. Industrial applications of the present invention may include insulation of exhaust gases and hot or cold fluids. As such, the composite insulation system may be used as a standalone insulation, covering, or customizable system or may be included within another system. As such, the composite insulation system may be included with other insulation systems such as metal encapsulated systems, jacketed systems or other wrap systems to provide additional insulation, covering, or customization to those systems.

In some embodiments, the composite insulation system of the present invention is configured to withstand and maintain structural integrity when used with components/applications operating at high temperatures and/or operating with large temperature fluctuations, like exhaust systems and other applications involving hot fluids. The composite insulation system may also be configured to withstand extreme environmental conditions and may also be configured to protect the component from or minimize rust and corrosion, deformation, wear and fatigue, surface deterioration, fracture and/or other damage. Furthermore, the composite insulation system may be configured to protect surrounding devices/members from high temperatures of the component itself and from high temperature fluids emitted from the component.

In some embodiments, the composite insulation system, and particularly the composite insulation or cover is mass-customizable, flexible and adaptable, and can be configured for insulation of a variety of components of different shapes, contours, sizes/dimensions, operating conditions and insulation requirements. In some embodiments, the composite insulation is infinitely customizable with respect to the desired shape, size, thickness, and insulation characteristics, without requiring separate insulation products for various applications. Typically, the composite insulation is inherently configured to conform to the shape of the component or the contour of the surface onto which it is applied, either before, during and/or after completion of the curing process, without requiring molds, dies and other external tools/devices. Typically, this customization may be achieved prior to, during and/or after assembly of the composite insulation and the component. In addition, in some embodiments, the composite insulation system is self-molding, fiber reinforced composite insulation. Furthermore, the structure of the composite insulation (thickness, shape, size and the like) and the characteristics of the insulation provided (thermal resistance, temperature limits, and the like) may be varied as desired, for example, by varying the number of structural reinforcement layers or varying the polymer matrix layers.

As discussed above, the composite insulation system of the present invention is a mass customizable, self-molding, fiber-reinforced composite insulation system that can be simply applied to an individual component or efficiently run on high-volume part configurations. In Typically, the composite insulation system comprises one or more structural reinforcement layers, one or more highly customizable matrix layers, a topcoat, a highly flexible self-molding cover, and/or a clamping mechanism provided on the component. Typically, the one or more structural reinforcement layers of the composite insulation comprise fibrous base layers configured to impart structural strength and integrity to the composite insulation. Furthermore, the self-molding cover, also referred to as an outer cover layer or an outer structural reinforcement layer, is configured to impart compressive strength such that an external mold is not necessary to consolidate the composite insulation on the component.

Typically, the composite insulation system further comprises matrix layers provided adjacent to, on, or between the various layers of the system described above, to impart stiffness and strength, and/or to achieve adhesion, union or linkage of the one or more structural reinforcement layers. As such, two or more layers of the composite insulation (for example, a pair of structural reinforcement layers or a structural reinforcement layer and the self-molding cover) may be fused together via the interfacial matrix layer to provide a rigid layer/cover around the component. In such embodiments, the layers of the composite insulation and the matrix (such as a polymer matrix) may become a cohesive composite when the composite insulation system is treated or cured.

The composite insulation system and its embodiments will now be described in detail with respect to FIGS. 1-16. FIG. 1 illustrates a perspective view of a composite insulation system 10, in accordance with various embodiments of the invention. In the embodiment illustrated in FIG. 1, the composite insulation 20 is provided on an outside surface of a component 30. As illustrated, the component 30 may be a hollow tubular member of a suitable cross-section (for example, polygonal or curvilinear cross-section) and suitable length extending along a straight or curved axis, such as an exhaust pipe. Furthermore, the cross-section of the component 30, defined perpendicularly to the axis of the component 30, may be constant throughout, or alternatively, the dimensions or shape of the cross-section may be variable along the length of the component 30. Typically, the component 30, such as the pipe 30 may comprise an outer surface 30a and an inner surface 30b separated by a thickness T. The outer surface 30a may be positioned outward, towards the surroundings of the component 30, while the opposing inner surface 30b may form a conduit for a fluid. Although referred to as a component 30, it is understood that the component 30 may refer to one or more components 30 such as one or more pipes, pipe fittings and the like.

The composite insulation system 10 further comprises the composite insulation 20 typically positioned proximate at least a portion of the outer surface 30a of the component 30. However, based on the desired application, the composite insulation 20 may be positioned on at least a portion of the outer surface 30a, at least a portion of the inner surface 30b and/or at least a portion of the lateral sides that terminate the outer and inner surfaces of the component 30.

Furthermore, as illustrated by FIG. 1, the composite insulation system 10 may comprise fastening members such as clamps 40 or other securing means that may be configured to securely hold the composite insulation 20 over a section/portion of the component 30. The clamps 40 may be screw or ratchet tightening clamps, band clamps, clips, ropes or other fastening means. In yet other embodiments, the clamps 40 may be wire twisted or tightened around the component 30, with the composite insulation 20 in between the clamp 40 and the component 30. Any number of clamps 40 may be employed, as required. The clamps 40 may be positioned, for example on an outer layer of the composite insulation 20 positioned on the component 30, either before, during or after treatment/curing of the composite insulation 20.

Typically, the composite insulation 20 is provided on the component 30. For example, layers of the composite insulation 20 may be placed one-by-one, with optional matrix layer coatings in between to construct the composite insulation 20 on the outer surface 30a of the component. The clamps 40 may then be fastened/positioned on the composite insulation 20 to secure it to the component 30. The assembly may then be suitably cured or treated, as will be described in detail elsewhere. As such, the composite insulation 20 is configured to conform to the outer surface 30a of the component 30, without requiring external molds and dies for shaping the insulation. In this regard, the component 30 itself may serve as a mold for the composite insulation 20.

FIG. 2 illustrates a perspective cut-away view of a composite insulation system 50, in accordance with some embodiments of the invention. Embodiments of the composite insulation system described herein are also referred to as a fiber-reinforced composite insulation system. This depiction details one of numerous embodiments of the invention, although the component 30, the clamps 40 and the composite insulation 20 of the composite insulation system 50, may by substantially similar to those described with respect to composite insulation system 10, illustrated in FIG. 1. FIG. 2 further includes a cut-away view of the composite insulation 20. As discussed previously, the composite insulation 20 may comprise one or more structural reinforcement layers, one or more interfacial matrix layers, a cover and/or a topcoat, in any suitable combination. Specifically, FIG. 2 illustrates the composite insulation 20 with a base/first structural reinforcement layer 60 or a base layer 60, a cover 80 or a second structural reinforcement layer, an interfacial matrix region 70 between the base structure reinforcement layer 60 and the cover 80, and a top coat 90 provided over the knit cover 80.

Typically, the one or more structural reinforcement layers, as referred to herein, (for example, the base structural reinforcement layer 60) typically comprise structural fibers made from high-temperature resistant materials that are configured to maintain their structural integrity at elevated operating temperatures, including, but not limited to e-glass, s-glass, basalt, silica, quartz, polytetrafluoroethylene (PTFE), meta-aramid, para-aramid, melamine, polybenzimidzole, polyimide oxidized polyacrylonitrile, other polymers, carbon, mineral, metallic, and/or ceramic materials. In some embodiments, at least a portion of the one or more structural reinforcement layers is constructed from e-glass, s-glass, basalt, silica, oxidized polyacrylonitrile, carbon fiber, mineral, and/or ceramic materials. In some embodiments, fibers composed of polyphenylene sulfide (PPS), polyethylenimine (PEI), polyether ether ketone (PEEK); fluoric polymers such as polytetrafluoroethylene (PTFE), ethylene-tetrafluoroethylene (ETFE), polyvinylidenefluoride (PVDF), ethylene-tetrafluoroethylene (ETFE), and combinations thereof may also be used. In some embodiments, the one or more structural reinforcement layers comprise polymeric films, metal films, metalized polymeric films, foils, fiber reinforced films and/or fiber reinforced foils.

As such, one or more of these temperature resistant materials may be used depending on the properties of the material (thermal conductivity/resistivity, durability under desired operating conditions, ductility/malleability, elastic/plastic deformation, and the like) and the application requirements of the composite insulation system. Specifically, each material may be rated for use at a higher and/or lower continuous operating temperature depending on the application. For example, e-glass may be rated for a maximum continuous operating temperature of 1000° F., while ceramics may be rated for continuous operation above the temperature of 2000° F.

The structural fibers of the one or more reinforcement layers may be in the form of continuous fibers, tow single end yarns, multiple end yarns, S- or Z-twist yarns, beamed yarn, plied yarns, or texturized yarns. In some embodiments, the structural fibers comprise elastomeric fibers including fibers that have high elongation, and recovery rapidly and fully from high elongations up to their breaking point. Elastomeric fibers including natural and synthetic rubbers, crosslinked rubbers, segmented polyurethanes, crosslinked polyacrylates, silicone rubbers, nitrile rubber, block olefin copolymers, polyamide fibers, bicomponent fibers, and/or combinations thereof may also be utilized as structural fibers, and specifically used in embodiments with braided tape configurations discussed elsewhere in this disclosure. In some embodiments, in addition to the structural fibers, the one or more reinforcement layers may comprise resin fibers comprising polyethylene terephthalate (PET), polyamide (PA), polyphenylene sulfide (PPS), polyphenylene oxide ether (PPE), polyethylenimine (PEI), polyether ether ketone (PEEK), fluoric polymers such as polytetrafluoroethylene (PTFE), ethylene-tetrafluoroethylene (ETFE), polyvinylidenefluoride (PVDF), and/or ethylene-tetrafluoroethylene (ETFE) based fibers.

The one or more structural reinforcement layers may comprise fibers in braided, knitted, woven, and/or non-woven configurations made from a suitable insulated material. For example, the base structural reinforcement layer 60 or the first structural reinforcement layer 60 may be a single braided base layer, multiple braided base layer, a knit layer, or the like. As such, braided constructions (such as single braided layers or multiple braided layers) may be employed for constructing the one or more structural reinforcement layers, such as the base reinforcement layer 60, in embodiments where the profile or thickness of the layer is required to be greater than a predetermined thickness. Braided constructions can typically deliver thicker profiles in comparison with knitted or woven constructions. Furthermore, braided constructions may allow for easy workability around components 30 such as pipe bends or the like. In addition, stretching the braided layer 60 along the length of the exhaust pipe 30 upon installation tends to tighten the braided layer down around the pipe 30 or any underlying layer along the straight and bent sections.

In some instances, a polymeric fiber requires a polymer with a specific viscosity in order to be able to draw down and spin the polymer into a fiber. However, unlike using fiber, using a ground polymer in this system allows manipulation of the polymer melt flow index ("MFI"), allowing for a larger range of MFI than possible in a fiber. In some embodiments, a high MFI ground polymer is used for ease of flow of the molten polymer between the layers of the composite system. In yet other embodiments, a low MFI ground polymer is used for more mechanical strength.

Typically, after the base reinforcement layer 60 is suitably positioned or wrapped on the component 30, a matrix layer 70 may be applied over the reinforcement layer 60. This matrix layer 70 may serve to strengthen or help impart rigidity to the reinforcement layer 60 (for example, after curing or heat treatment), and/or may help bond, fuse or physically connect the base reinforcement layer with the adjacent cover layer 80. In some embodiments, the matrix layer is achieved by application of a matrix solution, such as a liquid polymer matrix solution. As such, one or more matrix solutions may be applied on the one or more reinforcement layers to form the one or more matrix layers. In some embodiments, the one or more matrix solutions comprise a liquid polymer matrix solution. In this regard, the liquid matrix solution is thermoplastic, while in other embodiments, the matrix solution is thermosetting type. In some embodiments the matrix solution may contain both thermoplastic and thermoset solutions.

In some embodiments, the one or more matrix solutions comprise a thermoset polymer, wherein thermoset polymer comprises alkyd, amino, epoxy, phenolic, polyimide, polyurethane or silane polymers. The thermoset polymers may include one or more of alkyd, amino, epoxy, phenolic, polyester, polyimide, polyurethane, silicate, or silane. The thermoset polymer solution may include one or more organic or non-organic solvents, and/or one or more functional additives. The one or more additives may be chosen from a group comprising surfactants, emulsifiers, dispersants, rheology modifiers, and other functional additives.

In some embodiments, the one or more matrix solutions comprise a dispersion of ground thermoplastic polymer in an organic or non-organic solvent. The thermoplastic polymer may include polyester, nylon, PPS, or polyetherimide (PEI). In some embodiments, the thermoplastic matrix solution may be applied as a thermoplastic solvent-based polymer solution comprised of ground thermoplastic polymer (for example, the thermoplastic polymer fibers) and one or more of a surfactant or additive. The ground thermoplastic polymers may include, but are not limited one or more of polyethylene terephthalate (PET), polyamide (PA), polyphenylene sulfide (PPS), polyphenylene oxide ether (PPE), polyethylenimine (PEI), polyether ether ketone (PEEK), fluoric polymers such as polytetrafluoroethylene (PTFE), ethylene-tetrafluoroethylene (ETFE), polyvinylidenefluoride (PVDF), and ethylene-tetrafluoroethylene (ETFE). The thermoplastic polymer solution may include one or more organic or non-organic solvents, and/or one or more functional additives.

In some embodiments, various emulsifiers can be added to the solvent based polymer solution to aid in forming a stable solution. Exemplary emulsifiers include anionic surfactants (e.g., sulfates, sulfonates, and sacrocides), nonionic surfactants (e.g., polyethylene glycol (Triton X-100), ethoxylated linear alcohols, ethoxylated alkyl phenols, fatty acid esters, amine and amide depravities, or the like), cationic surfactants (e.g., linear alkyl amines and alkyl ammoniums, ester amides, ether amines, oxy amines, or the like), amphoteric surfactants (e.g., propionic acids, quaternized compounds), fluorinated surfactants (e.g., perfluorinated carboxylates and sulfonates), and the like.

In this regard, an interfacial matrix layer/region 70 is formed between the base reinforcement layer 60 and the cover layer 80, before, during and/or after the curing or treatment process. For example, in some embodiments the matrix layer solution has a predetermined first viscosity such that, on application of the matrix layer solution over the reinforcement layer 60, the matrix layer 70 with a first thickness is formed. In some embodiments, this first thickness reduces to a second thickness after a predetermined period of time after application, during curing process and/or after curing/treatment process (for example, due to permeation of the matrix solution from the layer 70 into at least a portion of the base reinforcement layer 60 and/or the cover layer 80), thereby fusing/connecting the adjacent layers, i.e., the base reinforcement layer 60 and the cover layer 80. Permeation as used herein refers to, absorption, percolation, adsorption, diffusion and/or permeation of the matrix layer into at least a portion of the adjacent reinforcement/cover layers, and/or generally imbuing the at least a portion of the adjacent layers with the matrix layer. Here, the matrix solution is configured to flow within and at least partially infuse the structural reinforcement layer (for example, fibers of one or more structural reinforcement layers) and/or the cover layer to form a multi-layer, fiber-reinforced composite insulation. This matrix layer 70 may solidify after the elevated temperatures of the curing process are withdrawn, thereby fusing the adjacent reinforcement layers (60, 80) together, forming the multi-layer, fiber-reinforced composite. Accordingly, one or more reinforcement layers are physically and/or chemically bonded together.

Furthermore, the matrix layer solution with the predetermined first viscosity may permeate into the base reinforcement layer 60 to a first depth (for example, after curing). In some embodiments, the depth of permeation is inversely proportional to the viscosity of the matrix layer solution, such that a matrix layer solution with a second viscosity lesser than the first viscosity will likely have a greater second depth of permeation, in comparison with the preceding solution with the other operating conditions being similar. In this regard, in some embodiments, the matrix solution may be diluted to the desired viscosity to thereby achieve the desired depth of permeation, using suitable solvents such as organic solvents, water, and the like. In some embodiments, the depth of permeation is inversely proportional to surface tension or surface free energy properties of the matrix layer when applied. In some instances, the surface tension properties of the matrix layer may be modified as desired using predetermined surfactants. In this regard, the matric layer solution may be chosen based on the required depth of permeation, operating conditions (for example, temperatures) required for curing, ability to fuse the adjacent layers, thermoplastic properties, thermosetting properties, ability to be diluted, suitability for operating conditions during usage (for example, a matrix layer that is not flammable during operation of the component), and the like. The penetration may be controlled via chemical composition, surface tension, mechanical force, vibration, turbulence and/or ultrasonic waves introduced to the bath.

In some embodiments, the matrix layer 70 is a part of the structural reinforcement layer 60 instead of or in addition to being applied over the reinforcement layer. In this regard, in some instances, a suitable matrix composition, comprising similar materials in a suitable state having similar properties as described above, may be provided around structural fibers of the reinforcement layer to form a composite yarn having a structural fiber at its core surrounded by the matrix material (for example, in a solid state). In some instances, the matrix composition may be provided as matrix fibers that may be interwoven, or inter-knit with the structural fibers and/or the resin fibers to form the structural reinforcement layer. In such embodiments, during or after curing, the matrix material may at least partially melt, liquefy or turn into a semi-solid state to help fuse adjacent reinforcement layers together, while the structural integrity of the structural reinforcement layers is typically maintained. Here, portions of molten matrix materials of adjacent reinforcement layers (60, 80) may coalesce and form an interstitial matrix layer 70 between the reinforcement layers, for example during the curing/heat treatment process. This matrix layer 70 may solidify after the elevated temperatures of the curing process are withdrawn, thereby fusing the adjacent reinforcement layers (60, 80) together, forming a multi-layer, fiber-reinforced composite insulation. It should be understood that, unless expressly specified, one or more matrix layers may refer to the matrix layers formed by application of a matrix solution and/or the matrix layers formed due to molten matrix materials of the reinforcement layers.

Next, after the application of the matrix layer 70, a cover layer 80 may be provided over the reinforcement layer 60. As alluded to previously, the cover layer 80 may be a type of reinforcement layer. In some embodiments, the structure, construction and/or properties of the cover layer 80 may be similar to those described previously with respect to the reinforcement layers. In some embodiments, the cover layer (also referred to as a "self-molding fiber cover") is a resilient, spring like structure or sleeve that is configured to be provided over the reinforcement layers. The cover layer is typically configured to provide compression around the component and the reinforcement layers. In some instances, the cover layer or the self-molding fiber cover comprises braided fiber materials, knit fiber materials, woven fiber materials, and/or non-woven fiber materials.

In some embodiments, the cover layer 80 may comprise a knit cover or a knit fabric, also referred to as the knit cover 80 or the self-molding fiber cover 80. The knit cover may contain structural, elastic and/or resin fibers. In some instances, the knit cover, and particularly the fibers of the knit cover, comprises glass, ceramic, metal, natural, metal, mineral, and/or polymer based fibers in various combinations. The knit cover may be formed by circular or wrap-knitting. The knit cover may be knit to the required size or knit to a larger size and cut and sewn to the required dimensions. In some embodiments, the knit cover may be knit into a sleeve 60.

Although referred to as a knit cover, it is understood that in some embodiments, the cover layer 80 may be fabricated from some or more of the above mentioned fibers in a braided, woven or non-woven configuration. In some instances, the knit cover may contain between 0% and 75% resin fibers depending on desired application. In some instances, the knit cover may contain between 0% and 10% elastic fibers. In some embodiments, the interior layer of the knit cover fabric is configured to transform during curing or treatment to create "hooks" that are embedded into one or more underlying layers.

The cover layer 80 is typically configured to conform to the shape of the surface onto which it is applied and configured to maintain its structural integrity during and after curing. Furthermore, the cover layer 80, also referred to as the self-molding cover, outer cover layer or an outer structural reinforcement layer, is configured to impart compressive strength such that an external mold is not necessary to consolidate the composite insulation on the component.

In some embodiments, a layer of matrix solution is also applied over the cover layer 80. That said, in some embodiments, the layer of matrix solution is applied only on the cover layer 80. Here, the matrix solution is typically configured to permeate through the cover layer 80 and into at least a portion of the reinforcement layer 60 beneath it, thereby forming the matrix layer 70. The interfacial matrix solution may be sprayed, brushed, coated, rolled, dipped or otherwise applied onto the base reinforcement layer 60 and/or the cover layer 80, or provided integral with the respective layer. This matrix solution may permeate the cover layer 80, and together with the matrix solution applied on the reinforcement layer 60, form the interfacial matrix layer 70. The interfacial matrix region 70 may form a continuous matrix between the matrix infused layers 60 and 80. After application of the interfacial matrix solution, the matrix infused base layer 60 and the matrix infused knit cover are also referred to as fibrous layers. This interfacial matrix region 70 between layers 60 and 80 creates a multilayer composite insulation 20 that contains two structural reinforcement layers (60, 80) comprising infused fibrous layers with a continuous matrix throughout and an interfacial matrix region between the 2 fibrous layers (60, 80). As such, the interfacial matrix regions 70 may be formed at any interface of the reinforcement layer/fibrous layer and the interfacial matrix, for example, between the outer surface 30a of the component 30 and the base reinforcement layer 60/fibrous layer 60, between the base reinforcement layer 60 and the knit cover/fibrous layer 80, on the outer surface of the fibrous layer 80, and the like. The interfacial matrix region 70 between the infused base layer 60 and the knit cover 80 illustrated in FIG. 2, serves the function of joining fibrous layers 60 and 80, physically and/or chemically.

In some embodiments, the base reinforcement layer 60 may be infused with a different matrix than the cover layer 80. Different matrix systems may be used depending on the end-use. In high-temperature applications, the base reinforcement layer 60 may be infused with a first high-temperature resistant matrix, since it is closest to the component 30, with the cover layer 60 being infused with the same or a different matrix solution with lower temperature resistance. In cold temperature applications, the base reinforcement layer 60 may be infused with a second matrix with suitable temperature resistance.

In some embodiments, the matrix solution applied on the base reinforcement layer 60 and/or the cover layer 80 may be completely infused or absorbed into the layers (60, 80) either before, during or after curing, resulting in the matrix layer 70 of a small thickness. Depending on the composition of the different matrix systems used, this thickness may be negligible or substantially non-existent, thereby resulting in a composite insulation 20 with no interfacial matrix layer 70, i.e., no significant interfacial matrix layer 70.

In some embodiments, the matrix solution is integrated or infused into the base reinforcement layer 60 and/or the cover 80, prior to installation of the base reinforcement layer 60 and the knit cover 80 onto the component. In this regard, in some embodiments, the infused layers typically retain flexibility and elasticity for assembly onto the component 30.

Furthermore, in some embodiments, as illustrated by FIG. 2, the composite insulation 20 may further comprise a topcoat 90. In some embodiments, the customizable top coat 90 may be a polymeric based system. In some embodiments, the customizable top coat comprises one or more dry ground polymers dissolved in a solvent and an emulsifier. The polymeric based top coat may be a thermoplastic or thermoset based system. In some embodiments, interfacial matrix layer 70 is achieved through diffusion of an external application of a matrix solution from layer 90 via brushing, spraying or dipping.

When treated/cured, a portion of the customizable top coat 90 may flow into the underlying layers of the composite system in some instances, thus providing layers that are mechanically and chemically bonded across each other, and creating a rigid layered composite when the assembly is heat treated. In some embodiments, at least a portion of the customizable top coat 90 may still be visible on the knit cover 80 after curing. As such, customizable appearances or outside layers with additional abrasion protection, strength, non-stick features, and other textures may be achieved based on the desired application. In some embodiments, clamps 40, such as stainless steel band clamps may be provided to affix the composite system to the pipe 10 before, during or after treatment/curing, although other attachment means such as wire twist bands or the like may be used. In some embodiments, the composite insulation 20 inherently adheres to the component and may not require clamps or other securing means.

In some embodiments, the top coat 90 may include one or more additives for additional abrasion protection such as fiber pulp, fumed silica, iron oxide, additives for thermal protection such as perlite and vermiculite, non-stick additives for dust build up prevention such as polytetrafluoroethylene (PTFE), additives for creating various textures such as glass spheres, additives for visible appearance, such as high temperature ceramic color pigments, additives for creating various textures and/or additives for additional strength such as metals, milled fibers, or carbon fiber. Although the embodiment illustrated in FIG. 2 illustrates one configuration of the composite insulation 20, it will be appreciated that the composite insulation system can include any configuration for use in a variety of different applications. In some embodiments, one or more functional additives may be added to the matrix or topcoat. Functional additives may include but are not limited to colorants, additives to improve abrasion resistance, flame resistant additives, surface tension modifiers, fillers, strength additives, glass-transition modifiers such as bentonite clay, additives for thermal protection such as infrared reflecting ceramics, and/or additives for creating various textures or visible appearances to the composite system such as titanium dioxide. Other additives may include lubricants, UV stabilizers, antimicrobials, antioxidants, and the like. Colorants may include but are not limited to high temperature ceramic pigments, metal pigments, clay earth pigments, carbon pigments, synthetic pigments, and other pigments to impart color and/or varying levels of opacity to the polymeric system. Additives to improve abrasion protection may include, but are not limited to iron oxide, ceramics, silicates, and metals. Flame resistance additives may include but are not limited to aluminum hydroxide, antimony oxides, chlorinated compounds, antimony oxides and organ phosphorus compounds. Fillers may include but are not limited to glass beads, fumed silica, pulps, clays, silica, talc, diatomaceous earth, lime and other inert materials. Surface tension modifiers may include but are not limited to fluorocarbons, wetting agents, and silicone. Strength additives may include but are not limited to milled carbon fiber, glass, metal and aramid fibers.

FIGS. 3-5 illustrate the embodiments of the composite insulation system with respect to various components. FIGS. 6a-6d and 7 illustrate various configurations of the multi-layered composite insulation system.

FIG. 3 illustrates a perspective view of a composite insulation system 100 around a component 110 and specifically a reduction pipe 110, in accordance with various embodiments of the invention. As illustrated, a 90 degree bent reduction pipe 110 is provided. The bent reduction pipe 110 includes a composite insulation 120 attached thereto. As illustrated, the layers of the self-molding composite insulation 120 may be applied, provided or slid onto the bent reduction pipe 110 and tightened such that there is no build-up of material at the interior of the bend and no build-up of material at the reduction site. In the embodiment illustrated in FIG. 3, for example, the larger opening 140 in the pipe 110 may be a 6 inch diameter opening. Continuing with the example, the smaller opening 150 of the pipe 110 may be a 4 inch diameter opening. Even with this reduction and the 90 degree bend, the composite system is configured to be positioned on the pipe and pulled tight without a build-up of materials and/or without requiring special molding equipment to produce a clean and even insulation.

FIG. 4 illustrates a perspective view a composite insulation system 200, in accordance with various embodiments of the invention. In the embodiment illustrated in FIG. 4, the composite insulation 220 is installed on a component 210, specifically a pipe 210, with a braided cover 230 and two clamps 240. The braided cover 230 may be infused with either a thermoplastic or thermoset matrix solution, as discussed previously. The braided cover 230 may be otherwise substantially similar to the cover layer described previously.

FIG. 5 illustrates an end view of a composite insulation system 250, in accordance with various embodiments of the invention. The end view of a component 260, specifically an exhaust pipe 260 (for example, a 4 inch exhaust pipe), is illustrated with a self-molding composite insulation 280 applied to the section of pipe. As illustrated, the self-molding composite system 280 has a clamp 270 on one end of the composite insulation 280. As noted previously, the composite insulation system 280 may comprise one or more layers. In some embodiments, the layers would be perceivable when viewed from the ends. However, as illustrated in FIG. 5, in other embodiments the matrix solution and one or more additives may cover/encapsulate the ends during assembly (from example, a portion of the matrix may move to the ends when the insulation is tightened), during curing, or specifically coated on to the ends of the system to create a clean end section 290 of the composite insulation system 280. In this way, the matrix solution, once cured is visible on the end section 290 and, as such, encapsulates the end section 290 to protect and conceal the layers of the composite system.

FIGS. 6a-6d illustrate cross-sectional views of various non-limiting configurations of the customizable composite insulation system of the present invention. Specifically, the FIGS. 6a-6b illustrate the structural reinforcement layers and interstitial matrix distribution through the cross-section of various embodiments of the insulation around a pipe 310. Through various matrix application techniques, the desired permeation of matrix solution can be achieved and the matrix solution may be infused into one or more structural reinforcement layers. This series of Figures attempts to illustrate a small selection of the numerous configurations that can be easily achieved with this mass-customizable, self-molding, fiber-reinforced composite insulation system.

FIG. 6a, illustrates a cross-section of the one embodiment of the invention. In this embodiment, the composite insulation comprises three fibrous reinforcement layers 320, 330 and 350 positioned on pipe 310. A first reinforcement layer comprising a braided fiber layer 320 (for example, an e-glass braided layer) is positioned on the outer surface of the pipe 310. A second braided layer 330 (for example, another e-glass braided layer) is positioned over the first braided layer 320. An interfacial matrix layer 340, for example a thermoplastic substrate, is found between the second braided layer 330 and the braided cover 350. In some instances, a knit cover 350 may be used instead of the braided cover 350. A topcoat 360, for example a thermoplastic topcoat, may be provided over the knit cover 350 as the outermost layer. In this instance, the interstitial matrix is typically continuous from the topcoat 360 through the second braided layer 330 and/or the first braided layer 320. This embodiment produces a strong, multi-layer composite insulation system with excellent durability. Although illustrated with three fibrous layers and one interstitial matrix regions, it is understood that more or fewer fibrous layers (either same or different fibrous layers) with one or more interstitial matrix regions (with either same or different matrix solutions) may be employed. For example, one embodiment of the composite insulation may comprise at least one structural reinforcement/fibrous layer, at least one interstitial matrix region, and/or at least one topcoat.

Therefore, as an example, the composite insulation system in this configuration may include two layers of e-glass braid and a braided cover in a thermoplastic matrix, along with a thermoplastic topcoat. For assembly or installation, the two layers of e-glass braid (320, 330) may positioned on the pipe 310 and trimmed, one after another. The braided cover 350 may then be slid over (in the case of a sleeve cover) or positioned over (for example, by wrapping the cover around the layer 330) the braided layers (320, 330) and pulled to a predetermined tension in the axial direction of the pipe. The braided cover 350 is typically configured to provide compression over the entire system in a radial direction of the pipe, and produce a smooth surface without any bumps or wrinkles. Clamps may then be installed on each end of the composite insulation and any material outside the clamps may be trimmed. The open ends of the pipe 310 may then be capped and the entire assembly or composite insulation system may then be submerged into a thermoplastic matrix solution. Here, the thermoplastic matrix solution may be optimized for dipping, for example by diluting it with a suitable solvent for optimal viscosity and density for the desired permeation. The composite insulation system may be submerged for a first predetermined period of time to ensure that the matrix solution penetrates at least the braided cover 350, at least the layer 330 and/or the layer 320 of e-glass braid. The cured insulation system may then be removed and cleaned. A thermoplastic topcoat 360 may also be brushed onto the cover material 350 to impart a highly repellent finish, such as a hydrophobic surface, to the surface. The assembly may further be cleaned before placing it in an oven for further curing at a predetermined temperature for a second predetermined time period. Once cured, the assembly may be removed and allowed to cool before mounting the cured composite insulated system on the component onto a machine/system for operation. In this embodiment, the composite insulation system is configured to cure tightly and rigidly around the pipe without wrinkles. The matrix may flow within and between the topcoat and $2^{nd}$ layer of braided e-glass 330 to form the interstitial region 340. The $2^{nd}$ layer of braided material 330 typically exhibits a continuous matrix from the topcoat 360 through the $2^{nd}$ layer 330.

In yet another instance, the composite insulation system may be substantially similar to that described above, but may include 4 layers of e-glass braid, a knit cover and thermoplastic matrix. For assembly, the three layers of e-glass braid may be installed and trimmed sequentially. The knit cover material may then be slid over the braided layers and pulled tight. Similarly, the clamps may then be installed on each end of the composite insulation and the material may be trimmed on the outside of the clamps. The open ends of the pipe may then be capped and the entire assembly may be submerged into a thermoplastic matrix solution optimized for dipping for certain predetermined time period to ensure that the matrix solution penetrates the $3^{rd}$, outermost layer of e-glass braid. The assembly may then be placed in the oven and cured. Once cured, the part may be removed and allowed to cool. Here, typically, the matrix flows within and between the cover and $3^{rd}$ layer of braided e-glass to form a 2-layer, fiber reinforced composite.

FIG. 6b, illustrates a cross-section of the composite insulation system in accordance with another embodiment of this invention. In this embodiment, the fibrous layers are 320, 330 and 350, assembled on pipe 310. This configuration may be substantially similar to the one described with respect to FIG. 6a, except that a knit cover 350 may be employed and the top coat may be eschewed. This embodiment typically produces a good quality multi-layer composite insulation system at a lower cost, specifically in comparison with the preceding embodiment.

For assembly of the composite insulation system including two layers of e-glass braid (320, 330), a knit cover 350, and forming an interstitial thermoplastic matrix 340, the first layer of e-glass braid 320 may be installed on the pipe 310 and trimmed. The second layer of e-glass braid 330 may then be installed over the first layer 320 and trimmed. A thermoplastic matrix solution may be sprayed onto the surface of the e-glass braid 330. The knit cover material 350 may then be slid over the braided layers (320, 330) and pulled tight. Clamps may then be installed on each end of the composite insulation and the material may be trimmed on the outside of the clamps. Thermoplastic matrix may then be sprayed onto the surface of the cover 350 and optionally allowed to rest for a predetermined period of time. The pipe and clamps may be cleaned before the assembly is cured in the oven at a predetermined temperature and for a predetermined time. The assembly may then be removed and allowed to cool. In this embodiment, the composite insulation system is configured to cure tightly around the pipe without wrinkles. The thermoplastic matrix may flow within and between the cover 350 and $2^{nd}$ layer of braided e-glass 330 to form the interstitial matrix layer 340 and thereby form a 2-layer, fiber reinforced composite. The $2^{nd}$ layer of braided material 330 typically exhibits a continuous matrix from the cover 350 through the $2^{nd}$ layer 330.

FIG. 6c, illustrates a cross-section of the composite insulation system in accordance with another embodiment of this invention. This embodiment may comprise at least two fibrous layers or reinforcement layers 380 and 350. In this embodiment, the pipe 310 is covered with a single layer of non-woven insulation 380, such as an e-glass braid. Directly outside the non-woven insulation 380 is the cover 350, such as a braided cover. The cover 350 may be knitted, braided, non-woven or a combination of these. The cover 350 may further comprise the interstitial matrix solution or interstitial matrix substrate (such as a thermoset polymner matrix) that acts to bind the non-woven insulation layer 380 and the cover 350 when cured/treated. Furthermore, a topcoat 360 may be provided over the cover 350. This embodiment typically produces an excellent insulation for the pipe 310, specifically by providing the aforementioned layers of a predetermined thickness.

During installation/assembly, the e-glass braid may be installed on the pipe 310 and trimmed. The braided cover 350 may then be installed over the layer 380. The braided cover 350 naturally compresses and forms insulation tightly around the pipe 310. The clamps may then be installed on each end of the composite insulation and the material may be trimmed outside of the clamps. Thermoset matrix may then be brushed onto the cover before placing the assembly in the oven. Here, the composite insulation system may cure tightly over the pipe 310 without wrinkles. The thermoset matrix is typically uniformly distributed throughout the braided cover 350, but may not penetrate the braided layer 380, in some instances. Typically, a uniform distribution of thermoset matrix throughout at least the braided cover 350 cross-section is achieved after curing in the oven. The curing of the thermoset matrix may be achieved, in some instances, by heating the assembly to a predetermined temperature (for instance, temperature in the range of about 400° F., or 700-800° F., and the like), to achieve cross-linking of the individual chains of the polymer.

FIG. 6d, illustrates a cross-section of the composite insulation system in accordance with another embodiment of this invention. In this embodiment, the pipe 310 may be covered with a metal foil layer 320. This embodiment may comprise three reinforcement/fibrous layers 330, 340 and 360. A first braided layer 330 may be positioned on the metal foil layer 320. A second braided layer 340 is positioned over the first braided layer 330. An interfacial matrix layer 350 may be found between the second braided layer 340 and the knit cover 360. A topcoat (not illustrated) may also be provided over the knit cover 360 based on the requirements of the application. In this instance, the interstitial matrix is typically continuous from the knit cover 360 through the second braided layer 340 and/or the first braided layer 330. This embodiment renders an excellent insulation system with a highly protective layer next to the pipe 310.

In one instance of the embodiment illustrated in FIG. 6d the first braided layer 330 may be a precut non-woven e-glass insulation layer, while the knit cover 360 may be substituted with a braided e-glass cover 360. Furthermore, the interstitial matrix substrate 350 may be a thermoplastic matrix solution. Therefore, the composite insulation system in this instance includes a layer of aluminum foil 320, a precut non-woven e-glass insulation layer 330, a braided e-glass cover 360 and a thermoplastic matrix solution, while the second braided layer may be absent. During installation, the aluminum foil layer may be installed tightly around the pipe 310 by wrapping the foil around the pipe 310 and folding any edges. The foil may be uncoated or coated on one or both faces to promote adhesion and/or protect the foil from any environmental exposure. The first layer of e-glass braid 330 may then be installed over the foil 320 and trimmed. The second layer of e-glass braid 340 may optionally be installed over the first layer 330 and trimmed. The braided cover 360 is then typically installed over the insulation layers. The braided cover 360, typically, naturally compresses and forms the insulation tightly around the pipe 310. The clamps may then be installed and any material ends may be trimmed. The ends of the pipe 310 may be capped and the entire assembly may be submerged into a thermoplastic matrix solution optimized for dipping. The assembly may be removed and cleaned before placing it in an oven for curing at a predetermined temperature for a certain period of time. Here, the composite insulation system is configured to cure tightly over the pipe without wrinkles. The thermoplastic matrix is configured to flow through the cover 360 and both layers of e-glass braid (330, 340). Typically, the thermoplastic matrix is continuous from the cover 360 to at last the foil 320, through all layers of the insulation system, also forming at least one interstitial matrix layer 350. In some instances, with high penetration of the thermoplastic matrix, another interstitial matrix layer may also be formed between reinforcement layers 330 and 340.

FIG. 7, illustrates a cross-section of another embodiment before and after curing/treatment. In this embodiment the FIG. 402 on the left displays the insulation system 402 with a base reinforcement layer 420, an interfacial matrix coating layer 430, a cover 440 and a topcoat 460. On the right, the interstitial matrix distribution of the same configuration is shown after curing/treatment for example, by heating the pipe 410 along with the composite insulation to a predetermined temperature to affect the curing of the interstitial matrix substrate and the fibrous layers. Here, the matrix is typically continuous from the outside to the inside of the composite insulation system, with the matrix penetrating throughout.

FIG. 8a, displays another embodiment of the composite insulation system 10 with a molded feature. The pipe 800 or the component 800 is illustrated with a composite insulation 810. On the side of the composite insulation 810, a section or at least a portion of the outer surface of the composite insulation 810 may molded into a flat portion 820. For example, a flat molding plate (not illustrated) may be applied prior to curing, that may then be removed after curing. Although illustrated as flat, any desired curvilinear contour may be molded as the molded portion 820 along at least a portion of the composite insulation 810, utilizing a device with a complementary surface/contour. The molded portion, for example, the flattened area 820 is configured to provide the required external clearance during operation. FIG. 8b, displays a cross-section of the composite insulation system 10, and particularly the molded feature 820 along the section AA of FIG. 8a.

FIGS. 9a-9b, display embodiments of the invention with localized insulation portions. Localized insulation may be used to tailor the composite insulation system's performance in local areas, as desired in specific applications. FIG. 9a illustrates a cut-away view of one embodiment of a composite insulation system 950a. The composite insulation system 950a may comprise composite insulation 920 on a pipe 900 with a localized insulation mat 910a positioned at a suitable location, for example, at the outer bend of the pipe 900. FIG. 9a illustrates the system with a section of the composite insulation 920 removed to indicate the positioning of the localized insulation mat 910a between the pipe 900 and the composite insulation 920.

In one instance of the embodiment illustrated in FIG. 9a the composite insulation 920 includes a first reinforcement layer comprising a first braided layer of e-glass braid, a knit e-glass cover, and a thermoplastic substrate. During installation, the localized non-woven insulation mat 910a may be secured to the pipe with a tack adhesive. Then the e-glass braid may be applied over the pipe and localized mat. Since the e-glass braid is highly conformable, it typically snuggly covers the pipe 900 and localized mat 910a. The knit cover may be installed next. The knit cover typically provides compression over the entire system including the portions with the localized mat 910a and is configured to produce a smooth surface without any bumps or wrinkles. Clamps may then be installed next and the material outside of the clamps may be trimmed. The open ends of the pipe may be capped and the entire assembly may be submerged into a thermoplastic matrix solution optimized for dipping for predetermined a period of time to ensure that the matrix solution penetrates the e-glass braid, but not the localized insulation mat. The part may then be removed and cleaned before curing in an oven.

In this embodiment, the composite insulation system typically cures tightly and rigidly around the pipe 900. The matrix may be configured to flow through cover and into the e-glass braid. Typically, the cover and e-glass braid are configured to be bonded together with a clear interfaces between the layers. The thermoplastic matrix is typically continuous from the cover to the e-glass braid. In this embodiment, the mat may be infused with the thermoplastic matrix if desired for a certain application.

FIG. 9b illustrates a cut-away view of another embodiment of a composite insulation system 950b. The composite insulation system 950b may comprise composite insulation 920 on a pipe 900 with a localized insulation sleeve 910b positioned at a suitable location, for example, at the outer bend of the pipe 900. FIG. 9b illustrates the system 950b with a section of the composite insulation 920 removed to indicate the positioning of the localized insulation sleeve 910b between the pipe 900 and the composite insulation 920. The localized insulation sleeve may comprise a braided silica sleeve. In some embodiments, the localized insulation sleeve may be installed next to the pipe 900 along the bend and dimensioned such that the sleeve 910b terminates before the ends of the layers above it.

In some embodiments, the localized insulation mat 910a and/or the localized insulation sleeve 910b, of FIGS. 9a-9b is a localized reinforcement layer. In some embodiments, the localized reinforcement layer is configured to mitigate differential expansion of the composite insulation system 950. In some instances, the component or pipe 900 may undergo thermal expansion and thermal contraction, for example, due to operating conditions, or due to cyclic temperature variations of the operating fluid carried within the pipe 900. However, the composite insulation 920 provided around the pipe 900 may not expand or contract in accordance with and/or at the same rate as the pipe 900, especially in the cases of the pipe being constructed out of a metal. This differential expansion of the composite insulation system may cause gaps or annular spaces to be formed between the outer surface of the pipe 900 and the composite insulation 920, during operation. These gaps may not be desirable in some instances, due to the modification in the insulating, covering, reinforcing, or supporting parameters of the composite insulation caused by the gaps. In this regard, the localized reinforcement layer 910a or 910b, such as a stainless steel tape, metal wool, and the like, may be provided between the composite insulation 920 and the pipe 900, at areas most prone to the differential thermal expansion. Although, if needed the localized reinforcement layer may be provided throughout between the composite insulation 920 and the pipe 900. During assembly, the matrix may be applied such that, when cured the localized reinforcement layer is embedded with the composite insulation 920. During operation, the localized reinforcement layer such as the steel tape may expand or contract, emulating the expansion/contraction of the pipe 900 with at least a portion still adhering to the composite insulation 920, thereby precluding differential thermal expansion and creation of any gaps between the composite insulation 920 and the pipe 900. In some embodiments, the localized reinforcement layer is a 3 dimensional braided metal tape. In some embodiments, the material of the localized reinforcement layer may be similar to the material of the pipe 900 to match the thermal expansion characteristics.

In some embodiments, the localized reinforcement layer 910a or 910b may be provided between the composite insulation 920 and the pipe 900 proximate the positions of the one or more clamps to protect the pipe 900 from localized abrasion due to the clamps. In some embodiments, the localized reinforcement layer 910a or 910b is configured to provide localized reinforcement or structural support to the pipe 900.

FIG. 10 illustrates a process flow for the method of assembling a composite system 1000, in accordance with various embodiments of the invention. As illustrated in block 1002, the process starts by positioning one or more reinforcement layers over a component at a predetermined location requiring insulation or reinforcement. For example, a reinforcement layer such as an e-glass braid is selected and slid over the component, such as a pipe. The reinforcement layer such as the braided base layer is typically configured to slide over any bends, reductions, valves, or the like. Once the braided base layer has been placed onto the component, it may be pulled tight over the exaction of the component or pipe. One or more additional reinforcement layers may also be positioned in a similar manner, either directly or after applying a matrix solution.

Typically, the reinforcement layers are configured such that once the material is placed over the component and pulled tight by application of tensile forces, the reinforcement layer remains secure over the component. In this regard, the reinforcement layers are typically pulled from the ends to cause the reinforcement layer to tighten over curves, bends, reductions, or the like of the component. The excess braid material may then be cut off or tucked into the pipe for subsequent removal while the process continues.

Next, as illustrated in block 1004, one or more matrix solutions are provided, for example, a liquid polymer matrix in the form of a solvent based polymer solution is applied over the reinforcement layer. The application may be via spraying, rolling, brushing, dipping, or the like. In this way, the reinforcement layer maybe completely coated with the polymer matrix. In some embodiments, however, the polymer matrix may already be incorporated in the reinforcement layer, and as such not requiring a separate external application of the polymer matrix to the base layer.

As illustrated in block 1006 of FIG. 10, a self-molding cover, such as a knit cover is slid over the one or more reinforcement layers in the polymer matrix. The knit may be a double layer knit sleeve that can slide over the underlying layers. In some embodiments, the knit cover may be finished as a flat fabric and then cut and sewn into the correctly sized tube. Subsequently, as illustrated in block 1008, the knit cover and composite system are secured to the pipe with securing means such as clamps, or the like.

Next, the customizable top coat may be applied, as illustrated in block 1010. In some embodiments, the customizable top coat may be a solvent based polymer solution, similar in chemical make-up to the polymer matrix that was previously added. As alluded to previously, the customizable top coat may also include various additives based on the application. Subsequently, heat may be applied to the entire composite system for the system to cure, as illustrated in block 1012. In this way, in some embodiments, the entire composite system, i.e., the component with the insulation layers, may be placed in an oven, preferably at a predetermined temperature, such as about 560° F., for a predetermined period of time, such as one hour, for curing/heat treatment. In other embodiments, only a portion of the composite system may be heat cured at a time, using an oven, heat gun, or the like.

Once cured, the self-molding composite system forms a rigid fiber reinforced composite insulation around the component. In this way, insulation for any pipe configuration, such as a bend, reduction, or the like may be created without the need for specific external molding devices. The final product is a rigid, tough, resistant to heat, and in some embodiments, non-flammable insulator. The cured composite system comprising one or more layers that are mechanically and chemically bonded utilizing a solvent based thermoplastic polymer solution, creating a rigid layered composite that may be sanded or otherwise further finished by the end user.

In some embodiments, the self-molding composite system is a repairable system. As such, if the system becomes worn, torn, or the like, it may be easily repairable without re-applying the system to the entire component. Furthermore, the self-molding composite system may act as a repair for damage to any other type of insulation or covering system as well. In this way, a repair mixture may be provided for performing a reapir. The mixture may be a solution including one or more dry ground polymers in crystalline or semi-crystalline form dissolved or otherwise dispersed in water and/or other solvent, such as isopropyl alcohol or the like, to form the repair solution. Exemplary ground polymers include polyphenylene sulfide (PPS); polyphenylene oxide ether (PPE); polyethylenimine (PEI); polyether ether ketone (PEEK); fluoric polymers such as polytetrafluoroethylene (PTFE), ethylene-tetrafluoroethylene (ETFE), polyvinylidenefluoride (PVDF), and ethylene-tetrafluoroethylene (ETFE).

Furthermore, similar to above, various emulsifiers can be added to the solvent based polymer solution to aid in forming a stable solution. Exemplary emulsifiers include anionic surfactants (e.g., sulfates, sulfonates, and sacrocides), nonionic surfactants (e.g., polyethylene glycol (Triton X-100), ethoxylated linear alcohols, ethoxylated alkyl phenols, fatty acid esters, amine and amide depravities, or the like), cationic surfactants (e.g., linear alkyl amines and alkyl ammoniums, ester amides, ether amines, oxy amines, or the like), amphoteric surfactants (e.g., propionic acids, quaternized compounds), fluorinated surfactants (e.g., perfluorinated carboxylates and sulfonates), and the like.

In some embodiments, additives may be added to the repair mixture in order to match the repair mixture to the current insulation in color, texture, strength, or the like. As such, the repair mixture may be made similar to the polymer matrix layer and/or the customizable top coat as described in detail previously.

As such, the repair mixture may be applied by brush, roller, spray, or the like, such that the repair mixture covers the damaged area of the insulation. After application of the repair mixture, heat may also be applied to cure the repair mixture. The heat may be applied via heat gun, oven, or the like. During curing, the repair mixture may flow into the various layers of the insulation and fuse them together to patch the damage created to the insulation.

In addition to the above, embodiments of the composite insulation system comprising one or more self-compressing materials are described below. These embodiments, illustrated in FIGS. 11-16, are directed to a composite insulation system that typically does not require additional devices to create a molded material. Here, the composite insulation system typically includes a braided flat tape that is configured to be wrapped around a component, abutted adjacent to the preceding and/or subsequent wrap, and tightened onto the component. In some embodiments, the braided flat tape may be saturated with a composite matrix prior to installation of the braided flat tape. In some instances, the braided flat tape is configured to be saturated with the composite matrix after installation of the braided flat tape to form a cohesive composite, and to impart stiffness and strength to the composite insulation system. The composite insulation system may utilize a composite matrix with additives to form a cohesive composite wrap and, in some embodiments a cohesive composite to provide rigid insulation and/or covering for a variety of components. As such, in some instances, the embodiments described with respect to FIGS. 11-16 are similar to those described with respect to FIGS. 1-10, wherein the reinforcement layer comprises a braided flat tape.

FIG. 11 illustrates a perspective view of a composite insulation system 50, in accordance with various embodiments of the invention. As illustrated in FIG. 11, a component 80, such as a pipe 80 is illustrated with a braided flat tape 60. In some embodiments, one or more braided flat tapes may be applied on the surface of the pipe 80 depending on the application. The braided flat tape is the structural reinforcement layer and may be constructed from materials of the reinforcement layers described previously. For example, in some instances, the braided flat tape 60 may be a fiber base substrate made from high-temperature tolerant materials to maintain the material's integrity at elevated temperatures, including, but not limited to e-glass, s-glass, basalt, quartz, polytetrafluoroethylene (PTFE), meta-aramid, para-aramid, melamine, polybenzimidzole, polyimide, silica, oxidized polyacrylonitrile, carbon fiber, and/or ceramic. One or more of these temperature resistant materials may be used depending on the exhaust application for the pipe 80. For example, e-glass may be rated for a maximum continuous operating temperature of 1000° F., while ceramics may be rated for continuous operation above the temperature of 2000° F.

The fibers of the braided flat tape 60 may be in the form of continuous fibers, tow single end yarns, multiple end yarns, S- or Z-twist yarns, beamed yarn, plied yarns, or texturized yarns. Other high temperature fibers may include meta-aramid fibers, para-aramid homopolymers and copolymers, ceramic fibers, glass reinforced fibers, metal or wire reinforced fibers, high density polyethylene fibers, polyimide fibers, polybenzimidazole fibers, oxidized polyacrylonitrile fibers and so forth. Fibers composed of polyphenylene sulfide (PPS), polyethylenimine (PEI), polyether ether ketone (PEEK); fluoric polymers such as polytetrafluoroethylene (PTFE), ethylene-tetrafluoroethylene (ETFE), polyvinylidenefluoride (PVDF), ethylene-tetrafluoroethylene (ETFE), and combinations thereof may also be used.

Elastomeric fibers may include fibers that have high elongation, and recovery rapidly and fully from high elongations up to their breaking point. Elastomeric fibers including natural and synthetic rubbers, crosslinked rubbers, segmented polyurethanes, crosslinked polyacrylates, silicone rubbers, nitrile rubber, block olefin copolymers, polyamide fibers, bicomponent fibers, and/or combinations thereof may also be utilized as fibers of the braided flat tape 60.

Braided construction may be utilized due to its high conformability and since it can deliver thicker profiles than knitted materials or woven materials. In some embodiments, the braided flat tape 60 is made from a tow. In this way, the braided flat tape 60 comprises elastic longitudinal tows and inelastic oblique tows. As an illustration, in one embodiment, the braided flat tape 60 comprises silica of about 1/16 inches thick and/or glass of about 0.2 inches thick. Furthermore, the braided construction allows for easy workability around components such as pipe bends or the like. For example, stretching the braided material along the length of the exhaust pipe upon installation tends to tighten the braid down around the pipe 80 or underlying material along the straight and bent sections. Furthermore, the braided flat tape 60 may be separated to allow for flanges, sensors, or other apertures extending from the pipe 80 to be exposed without causing a buildup of wrap material around the flange. As such, the braided flat tape 60 may be spread apart in that particular location to allow the flange to extend from the pipe 80.

Depending upon the application and specification of the desired composite insulation system, a single wrapped braided flat tape 60 may be used, or multiple wrapped braided flat tapes may be used.

As illustrated in FIG. 11, the braided flat tape 60 may wrapped such that the braided flat tape 60 abuts adjacent strips of tape. The abutment 70 is a tight junction between two adjacent braided flat tape 60 wraps. The unique nature of the braided flat tape 60 allows a user to wrap the braided flat tape 60 around the pipe 80 and subsequently slide the braided flat tape 60 and maneuver the braided flat tape 60 to make it tight on the pipe 80 and have the wrappings adjacent to each other. In this way, in some embodiments, the system requires no overlapping wraps or the like. Furthermore, no clamps or holding devices are necessary for the wrapping process. The ends of the wrap are tucked under adjacent wraps 90 to hold the ends in place and produce a clean end product without the need for clamps or alternative holding means.

In some embodiments, the braided flat tape 60 has a composite matrix incorporated therein. In other embodiments, a composite matrix may be applied to the braided flat tape 60 once the braided flat tape 60 has been installed on the pipe 80. The composite matrix may be applied by spraying, brushing, coating, rolling, dipping or otherwise applying the solution onto one or more of the braided flat tape 60. That said, it is also contemplated that the braided flat tape 60 may be wrapped such that the braided flat tape 60 overlaps at least a portion of at least one adjacent/proximate strip of tape, in some instances based on the desired application and the contours/structure of the pipe or component 80.

The composite matrix may comprise a mixture of vermiculite with an inorganic bonding agent, such as colloidal silica, sodium silicate, or the like. This mixture may also be diluted with water and various additives may be included depending on the application and customized desired. In some embodiments, the additives that can be used are in the form of powders, liquids, slurries, granules, and suspensions, as well as dyes. In some embodiments, additives such as thermoplastic polymers and thermoset polymers may be added to the composite matrix. In some embodiments, color pigments may be added to provide various colored customized looks to the pipe 80. The color additives may be in the form of dyes or high temperature ceramic colors, metal pigments, clay earth pigments, carbon pigments, synthetic pigments, and other pigments can be used to impart color and/or varying levels of opacity. Additionally, additives for additional abrasion protection such as iron oxide, additives for additional strength, rigidity, durability, such as ceramics, metals, such as aluminum, or milled fiber, additives for providing customized looks or textures such as glass spheres to fill holes, provide a non-stick surface, and/or the like. Other additives may include perlite or the like.

In some embodiments, the composite matrix may be dried on the pipe, without adding additional heat. In some embodiments, curing may occur at operation temperatures of the component itself. In this way, once the composite matrix has cured, the system forms a high temperature resistant, breathable, rigid, and customized wrap for insulating and protecting components from external damage, such as weather, abrasion, blunt force, or the like.

FIG. 12 illustrates a perspective view of a composite insulation system 10, in accordance with various embodiments of the invention. In the embodiment illustrated in FIG. 12, the composite insulation system is applied to the outside of a pipe 30, such as an exhaust pipe, and may comprise additional materials applied to the braided flat tape wrap 50 illustrated in FIG. 11.

In some embodiments, the outer visible portion 20 of the composite insulation system includes an optional knit composite cover and an optional customizable solvent based polymer solution top coat cured thereon. In yet other embodiments, braided flat tape with a composite matrix may be the outer visible portion 20, with no optional knit composite cover or optional customizable solvent based polymer solution top coat, as illustrated in FIG. 11.

In some embodiments, the outer visible portion 20 may comprise a customizable solvent based polymer solution top coat of compounded polymer solution that includes one or more additives depending on the application. In this way, the customizable top coat includes one or more of dry ground polymers in crystalline or semi-crystalline form dissolved or otherwise dispersed in water and/or other solvent, such as isopropyl alcohol or the like, to form a solution. The solvent based polymer solution also, in some embodiments, including emulsifiers such as a surfactant.

Depending on the application, the customizable solvent based polymer solution top coat may also include various additives including: abrasion protection additives such as iron oxide, additives for thermal protection such as perlite, non-stick additives for dust build up prevention such as polytetrafluoroethylene (PTFE), additives to modify the porosity, such as glass spheres, additives for creating various textures such as glass spheres, additives for visible appearance, such as high temperature ceramic color pigments, and/or additives for additional strength such as metals, milled fibers, or carbon fiber.

In some embodiments, the outer visible portion 20 of the composite insulation system includes a knit cover. The knit composite cover may be a fabric circular knit sleeve that is manufactured to specific specification so as to fit around the component or pipe 30 and the underlying wrap. The knit composite cover may be a double knit that maintains its structural integrity while melting. The knit composite cover includes a doubled knitted tube that fits around the other, underlying material. In some embodiments, the knit composite cover contains glass and 20% resin fibers. In some embodiments, the knit composite cover may contain between 0% and 85% resin fibers depending on desired application. In some embodiments, the knit composite cover comprises a knitted fabric that includes a combination of glass fibers and thermoplastic fibers and/or resin-based fibers. Thermoplastic fibers may include polyester, nylon, PPS, or polyetherimide (PEI). Furthermore, the knit composite cover provides a structure that provides molding compression to the underlying materials of the system.

In some embodiments, the outer visible portion 20, illustrated in FIG. 12, covers a base of wrapped braided flat tape 40. As illustrated, the wrapped braided flat tape 40 is under the outer visible portion 20 which includes a knit composite cover and customizable solvent based polymer solution top coat. However, in some embodiments, the wrapped braided flat tape is the outer portion that is visible. The various patterns and optional materials are illustrated in more detail below with respect to FIGS. 15*a*-15*f*.

In some embodiments, the braided flat tape 40 comprises fibers or yarns composed of twisted fibers. In some embodiments, the braided flat tap 40 is made from a tow. In this way, the braided flat tape 40 comprises elastic longitudinal tows and inelastic oblique tows. Braids are formed by interweaving multiple fibers and/or yarns. The braids are used to form the braided fabric having biaxial, triaxial, or unidirectional architecture. Due to its structure, braided fabric can be made thicker than other types of fabrics.

The braided fabric comprises glass fibers, other high temperature fibers, elastomeric fibers, and/or other yarns or fibers. The fibers can be composed of various types of glass such as E-glass and S-glass, basalt, quartz, polytetrafluoroethylene (PTFE), meta-aramid, para-aramid, melamine, polybenzimidzole, polyimide, silica, oxidized polyacrylonitrile, carbon fiber, and/or ceramic. Depending upon the application and specification of the desired composite insulation system, a single wrapped braided flat tape 40 may be used, or multiple wrapped braided flat tapes may be used.

FIG. 13*a*-13*c* illustrates a front view of a composite insulation system being applied around a flange. FIG. 13*a* illustrates a front view of a component prior to being wrapped with the composite insulation system 100. As illustrated in FIG. 13*a*, the pipe 110 that is to be wrapped with the composite insulation system includes a 45 degree bend 115 and a flange 120. Flanges 120 are becoming more and more prevalent on exhaust piping 110 because of additional oxygen sensors, other sensors, mounting applications, or the like that are being increasingly included on the exhaust pipe 110

Traditional wrapping requires overlapping of wrap layers and does not have any stretch or elasticity in the wrap nor does it have any means of opening up the wrap to accommodate the flange within the wrap. As such, traditional wrapping would require several wraps to attempt to cover the area around the flange 120. This is because the area around each of the sides of the flange 120 would need to be wrapped. As such, multiple overlapping layers of wrap may be needed to achieve full coverage around the flange 120. In this way, the additional wraps would create a bulged area of wrap around the flange 120. Furthermore, traditional wrapping would also create a bulged overlapping area on the inside of the 45 degree bend 115, while creating an expanded and thinner area of wrapping around the exterior of the 45 degree bend.

FIG. 13b illustrates a perspective view of a composite insulation system being applied around a flange 150, in accordance with various embodiments of the invention. FIG. 13b illustrates the same pipe 110 as FIG. 13a, however FIG. 13b has been wrapped in the composite insulation system. In this way, braided flat tape 125 maybe wrapped around the pipe 110. Importantly, in some embodiments, the braided flat tape 125 of the composite insulation system may be designed not to overlap, but instead for adjacent wraps to abut each other. The composite insulation system, specifically the braided flat tape 125 of the composite insulation system may be easily conformed to accept the flange 120 by spreading or alternatively opening 130. In this way, the area around the flange 120 is completely covered and no additional wrapping or budging of layers of wrapping occurs. The wrapping around the 45 degree bend 115 creates a smooth wrap around the bend without any bulging or thin places. In this way, the braided flat tape may compress and abut each other on the inside of the bend 145, while on the outer portion of the bend 115 the braided flat tape may stretch and/or expand 140 to create a uniform thickness across the bend 115.

FIG. 13c illustrates a top view of a composite insulation system being applied around a flange 200, in accordance with various embodiments of the invention. As illustrated the pipe 110 is wrapped in the composite insulation system. In this way, braided flat tape 125 has been wrapped and tightened around the pipe 110. As illustrated, the ends of the braided flat tape 125 are under wrapped and tucked under adjacent wraps 160 such that no clamping or other holding means is necessary for the composite insulation system. The braided flat tape 125 may be stretched and/or alternatively opened 130 to wrap around the flange 120 without adding additional wraps and unnecessary bulk to the wrap around the flange 120. Thus, creating a smooth uniform wrap even around angles and around flanges.

FIG. 14 illustrates a perspective view of a composite insulation system 250, in accordance with various embodiments of the invention. In the embodiment illustrated in FIG. 14, a 90 degree bend is wrapped in the composite insulation system. In this way, the braided flat tape 255 is started by wrapping over the first wrap 290 to lock the braided flat tape 255 into place. The braided flat tape 255 may then be wrapped and tightened such that each wrap of the braided flat tape 255 abuts the adjacent wrap segment. Once the braided flat tape 255 reaches the 90 degree bend in the pipe 260 the braided flat tape 255 on the outer portion of the 90 degree bend 280 has flexibility to stretch to remain in contact with adjacent strands while still providing smooth coverage of the of bend without any overlapping or bulging of wraps. The inside of the 90 degree bend in the pipe 260 comprise braided flat tape 270 that may compress along the width of the wrap to maintain the abutting of adjacent wraps without creating a bulge or overlapping wrapping.

In some embodiments, multiple braided flat tapes 270 may be wrapped around a critical or high temperature portion of the pipe 260 multiple times to target specific areas for additional insulation and/or protection.

FIGS. 15a-15f illustrate cross-sectional views of various embodiments of the composite insulation system, in accordance with various embodiments of the invention. As one of ordinary skill in the art will appreciate, these materials form a composite, as such the materials illustrates are not laminated or layered, but instead are cured to form a composite material. The embodiments illustrated in FIGS. 15a-15f illustrate alternative materials to create the composite insulation system based on user application.

In the embodiment illustrated in FIG. 15a, the component 310 or pipe 310 has a base material 320 adjacent thereto. The base reinforcement layer 320 is a wrapped fiber based substrate that is formed into a braided flat tape of suitable dimensions, for example, about 2 inches in width. In other embodiments, the width and thickness of the base material varies based on the application and the shape of the component. A composite matrix 330 may be applied to the surface of the base layer 320 after the base 320 was installed on the pipe 310, or alternatively the matrix may be integrated into the structure of the base layer 320. The composite matrix 330 may include a silicate material, including a phyllosilicate, such as vermiculite with an inorganic binder, vermiculite, colloidal silica, potassium silicate, calcium silicate, bitumen, calcium aluminate, and/or sodium silicate. This mixture may also include additives may be included, such as, but not limited to color pigments in the form of high temperature ceramic colors, additives for additional abrasion protection, additives for thermal protection, additives for strength, additives for rigidity, additives for durability, and/or additives for creating various textures or visible appearances to the composite system.

In the embodiment illustrated in FIG. 15b, the component or pipe 310 has a base of braided flat tape saturated with a composite matrix already incorporated 306, prior to application of the base to the pipe 310. As such, the end user may be able to wrap the pipe 310 with a braided flat tape that is saturated in the composite matrix. As such, when the end user receives the composite insulation system, the braided flat tape is already wetted with the composite matrix. Thus, the end user may wrap the pipe 310 with the base with composite matrix solution incorporated therein 360.

In the embodiment illustrated in FIG. 15c, the component or pipe 310 has a base 320 adjacent thereto. The base 320 a braided flat tape. A composite matrix 330 is then applied to the braided flat tape of the base 320. The composite matrix 330 includes vermiculite, colloidal silica, potassium silicate, calcium silicate, bitumen, calcium aluminate, and/or sodium silicate. This mixture may also include additives based on various applications or customizations desired.

To the composite matrix 330, the embodiment illustrated in FIG. 15c includes applying a customizable solvent based polymer solution 350. The customizable solvent based polymer solution 350 comprises a solvent based polymer solution that is sprayed, brushed, coated, rolled, dipped, or otherwise applied to the underlying material. In some embodiments, the composite matrix 330 and the customizable solvent based polymer solution 350 are not cleanly separable, there may be considerable interfacial penetration between the materials.

Dry ground polymers in crystalline or semi-crystalline form may be dissolved or otherwise dispersed in water and/or other solvent, such as isopropyl alcohol or the like, to form a customizable solvent based polymer solution 350. Exemplary ground polymers include polyphenylene sulfide (PPS); polyphenylene oxide ether (PPE); polyethylenimine (PEI); polyether ether ketone (PEEK); fluoric polymers such as polytetrafluoroethylene (PTFE), ethylene-tetrafluoroethylene (ETFE), polyvinylidenefluoride (PVDF), and ethylene-tetrafluoroethylene (ETFE); and/or the like. In some embodiments, non-flammable polymers are used in the customizable solvent based polymer solution 350. In some embodiments, depending on the application, flammable polymers may also be used in the customizable solvent based polymer solution 350.

In some embodiments, various emulsifiers can be added to the customizable solvent based polymer solution 350 to aid in forming a stable solution. Exemplary emulsifiers include anionic surfactants (e.g., sulfates, sulfonates, and sacrocides), nonionic surfactants (e.g., polyethylene glycol (Triton X-100), ethoxylated linear alcohols, ethoxylated alkyl phenols, fatty acid esters, amine and amide depravities, or the like), cationic surfactants (e.g., linear alkyl amines and alkyl ammoniums, ester amides, ether amines, oxy amines, or the like), amphoteric surfactants (e.g., propionic acids, quaternized compounds), fluorinated surfactants (e.g., perfluorinated carboxylates and sulfonates), and the like.

In some embodiments, the customizable solvent based polymer solution 350 may include a ground polymer such as PPS, water as a solvent, a surfactant such as Triton X-100, and propylene glycol.

In some embodiments, the customizable solvent based polymer solution 350 may include various additives based on the application. These additives that can be included in the solvent based polymeric solution in the form of powders, liquids, slurries, granules, and suspensions, as well as dyes. These additives may include color pigments, additives for additional abrasion protection such as iron oxide, additives for additional strength, rigidity, and durability such as ceramics, metals, such as aluminum, or milled fiber, additives for providing customized looks or textures such as glass spheres to fill holes, provide a non-stick surface, and/or the like.

The customizable solvent based polymer solution 350 may also include fillers to thicken and/or add volume to the solution based on application and application method. In some cases, fillers such as clays, silica, talc, diatomaceous earth, lime, and other inert materials may be added. Other fillers that can be added to the solvent based polymer solution such as reinforcing materials to further improve interfacial bonding strength such as milled fibers, glass fibers, carbon fibers, nylon (polyamide) fibers, polypropylene fibers, quartz particulate, plant based pulp, and the like. Other additives that can be included in the polymer solution include lubricants, UV stabilizers, antimicrobials, antioxidants, and the like.

In the embodiment illustrated in FIG. 15d, the component or pipe 310 has a base with solution incorporated therein 360 adjacent thereto. As such, the end user may be able to wrap the pipe 310 with a braided flat tape that is saturated in the composite matrix. Adjacent to the solution incorporated braided flat tape 360, the embodiment illustrated in FIG. 15d includes a customizable solvent based polymer solution 350 that may include a ground polymer such as PPS, water as a solvent, a surfactant such as Triton X-100, propylene glycol, and one or more additives based on the application of the system.

In the embodiment illustrated in FIG. 15e, the component or pipe 310 has a base. The base 320 is a wrapped fiber based substrate that is formed into a braided flat tape. Adjacent to the base 320 of wrapped braided flat tape is a composite matrix 330 that is applied to the base 320. The composite matrix 330 includes vermiculite and colloidal silica. Next, adjacent to the composite matrix 330 the embodiment illustrated in FIG. 15e includes a knit composite cover 340. The knit composite cover 340 is double knit that contains glass and between 0% and 85% resin fibers. In some embodiments, the knit composite cover contains glass and 20% resin fibers. In some embodiments, the knit composite cover provides a structure that provides molding compression to the underlying materials of the system. The knit composite cover 340 is a double knit designed with an interior portion to melt and/or break to transform during curing to create a hook to reach into the material below the knit composite cover 340 to create a mechanical bond between the materials of the system.

In some embodiments, the knit composite cover 340 comprises a knitted fabric that includes a combination of glass fibers and thermoplastic fibers and/or resin-based fibers. Thermoplastic fibers may include polyester, nylon, PPS, or polyetherimide (PEI). The knit composite cover 340 may slide on over the underlying material of the composite system. In some embodiments, the knit composite cover 340 provides a fabric backbone constructed to hold compression during heat curing such that no mold is necessary.

Finally, as illustrated in FIG. 15e, a customizable solvent based polymer solution 350 is applied to the knit composite cover 340. In some embodiments, the customizable solvent based polymer solution 350 may include various additives based on the application. These additives that can be included in the solvent based polymeric solution in the form of powders, liquids, slurries, granules, and suspensions, as well as dyes. These additives may include color pigments, additives for additional abrasion protection such as iron oxide, additives for additional strength such as ceramics, metals, such as aluminum, or milled fiber, additives for providing customized looks or textures such as glass spheres to fill holes, provide a non-stick surface, and/or the like.

When cured, a portion of the customizable solvent based polymer solution 350 may melt into the knit composite cover 340 and the base 320, thus provided materials that are mechanically and chemically bonded across each other, creating a rigid composite.

In some embodiments, heat may be applied to the composite system illustrated in FIG. 15e. In this way, the multiple materials of the system may be heated to cure the polymer resulting in a cured composite system with fused materials.

In the embodiment illustrated in FIG. 15f, the component or pipe 310 has a base with solution incorporated therein 360 adjacent thereto. As such, the end user may be able to wrap the pipe 310 with a braided flat tape that is saturated in the composite matrix. Next, adjacent to the base with solution incorporated therein 360, the embodiment illustrated in FIG. 15f includes a knit composite cover 340. The knit composite cover 340 is a double knit designed with an interior portion to melt and/or break to transform during curing to create a hook to reach into the materials below the knit composite cover 340 to create a mechanical bond between the materials of the system.

Adjacent to the knit composite cover 340, the embodiment illustrated in FIG. 15f includes a customizable solvent based polymer solution 350 that may include a ground polymer such as PPS, water as a solvent, a surfactant such as Triton X-100, propylene glycol, and one or more additives based on the application of the system. When cured, a portion of the customizable solvent based polymer solution 350 may melt into the knit composite cover 340 and the base 320, thus provided materials that are mechanically and chemically bonded across each other, creating a rigid composite.

Furthermore, while the embodiments illustrated in FIG. 15 illustrates the composite insulation system being applied to a pipe, one of ordinary skill in the art will appreciate that any component may be wrapped with the composite insulation system in order to provide insulation, protection, or customization to that component. Furthermore, the composite insulation system may be applied on to components with foil or alternative insulation or protective systems already on the component. As such, the composite insulation system may be utilized in correlation with any current insulation system such as metal encapsulated systems, jacketed systems or other wrap systems to provide additional insulation, covering, customization to those systems, or the like.

FIG. 16 illustrates a process flow 1600 for the method of applying a composite insulation system, in accordance with various embodiments of the invention. The process 1600, starts when the end user receives the composite insulation system. In some embodiments, the composite insulation system may be provided to the user dry. In this way, the user may apply the braided flat tape then subsequently apply any composite matrix or the like onto the braided flat tape. In other embodiments, the composite insulation system may be provided to the user in a wet state. In this way, the braid may be manufactured with the composite matrix incorporated therein. If the composite insulation system is provided in a wet state, the composite insulation system may be provided in a sealed container or the like to avoid drying of the composite matrix during shipment and storage. Furthermore, this would prevent debris and disturbance of the composite insulation system. In some embodiments, a biocide may be added to the packaging of the wet composite insulation system.

As illustrated in block 1602, the user may start to wrap the braided flat tape around the pipe section, including any bends, reductions, flanges, or the like. During the wrapping process, the starting end of the braided flat tape may be tucked under and into a wrapped section, as illustrated in block 1604. Once the end of the braided flat wrap is tucked in under existing wraps, the user may continue to wrap the braided flat tape onto the pipe and about the adjacent wraps, as illustrated in block 1606. Next, in some embodiments, a flange may be present on the pipe that is being wrapped. In this way, as illustrated in block 1608, the braided flat tape may be opened to accept the flange or other protrusions extending from the pipe.

Once the user has completed wrapping the desired section of the pipe or component, the user may tuck the end under the last few wraps. The user may then manipulate a wrapping by tightening the braided flat tape to create a tightly wrapped pipe with wraps of the braided flat tape being adjacent to each other, as illustrated in block 1610. The unique characteristics of a braided material allow the material to be tightened around a component and remaining secure. The braided tape tightens over the curves, bends, reductions, or the like of the component.

Next, as illustrated in block 1612, the user may apply the composite matrix with one or more desired additives for a customized look. The user may spray, brush, coat, roll, dip, or otherwise applied the composite matrix onto one or more of the braided flat tapes of the system. In some embodiments, the composite matrix may be incorporated into the braided flat tape prior to wrapping the braided flat tape on the pipe. In this way, the user may not need to apply the solution, instead, the solution may already be applied to the braided flat tape prior to the user receiving the composite insulation system.

Once the composite matrix has been applied, the user may continue by optionally applying a knit composite cover and/or a customizable solvent based polymer solution, as illustrated in block 1614. The knit composite cover may be slid over the braided flat tape. The knit may be a double knit sleeve that can slide over the underlying materials. In some embodiments, the knit composite cover may be finished as a flat fabric and then cut and sewn into the correctly sized tube. Furthermore, the knit composite cover provides a structure that provides molding compression to the underlying materials of the system. The customizable solvent based polymer solution is a compounded solvent based polymer solution that contains one or more ground polymers, a solvent, and in some embodiments a surfactant. The customizable solvent based polymer solution may also include various additives based on the application. These additives may include color pigments in the form of high temperature ceramic colors, additives for additional abrasion protection, additives for thermal protection, and/or additives for creating various textures or visible appearances to the composite system.

Finally, as illustrated in block 1616, the composite insulation system is allowed to cure. In some embodiments, the composite insulation system may dry while on the pipe with no heat added. In other embodiments, heat may be applied to the entire composite system for the system to dry and/or cure.

The final product being a wrap that is rigid, tough, resistant to heat, and in some embodiments, a non-flammable insulator capable of being wrapped into any shape necessary to cover various pipe configuration in a smooth and uniform manner.

As such, the composite insulation of the present invention may comprise superior properties and performance characteristics. Specifically, the present invention is configured to provide superior insulation with higher thermal resistance, thereby substantially maintaining the temperature of the component. In this regard, for example, for a component or a fluid within the component a temperature of about 1200° F., the surface temperatures of the composite insulation are typically in the range of 300-360° F. (or within, around or overlapping the range), in comparison with conventional insulation which has lower thermal resistance, and hence absorbs and dissipates more heat resulting in surface temperatures typically in the range of 450-540° F. That said, the composite insulation of the present invention may be configured to provide, surface temperatures in range of 312-320° F., 330-350° F., 360-364° F., 370-385° F., 396-400° F., 410-458° F., 446-498° F., and/or 490-533° F. (or within, between, or overlapping these ranges), based on the configuration of the layers and the matrix employed.

The composite insulation of the present invention is configured to provide superior impact strength and toughness. In this regard, for example, for a Gardner Impact test, the mean failure heights of the composite insulation are typically in the range of 0.5-0.8 mm (or within, around or overlapping the range), in comparison with conventional insulation which typically exhibits failure heights of 0.10-0.5 for the same setup. That said, the composite insulation of the present invention may be configured to provide, mean failure heights for a Gardner impact test in range of 0.12-0.18 mm, 0.49-0.76 mm, and/or 0.54-0.86 mm (or within, between, or overlapping these ranges), based on the configuration of the layers and the matrix employed.

The composite insulation of the present invention is configured to provide superior surface properties and resistance to degradation, chipping and gravel impact. In this regard, for example, for a gravelometer test, the composite insulation typically produces negligible, or no cuts at all, while conventional insulation exhibits around 20 cuts, for the same setup. That said, the depth of the cuts for any present cuts may be in range of 0-0.06 mm, 0.06-0.09 mm, and/or 0.3-0.6 mm (or within, between, or overlapping these ranges), based on the configuration of the topcoat and the cover layer employed.

The composite insulation of the present invention is configured to provide superior resistance to abrasion. In this regard, for example, the abrasion ratings of the composite insulation are typically greater than at least 1000 cycles, while conventional insulation typically exhibits abrasion ratings of 7-27 cycles for the same operating conditions. That said, the composite insulation of the present invention may be configured to provide abrasion ratings in range of 288-422 cycles, 760-800 cycles, and/or greater than 1000 cycles (or within, between, or overlapping these ranges), based on the configuration of the composite insulation.

The composite insulation of the present invention is configured to provide better structural integrity and hydrophobic properties. In this regard, for example, the water drop disappearance time for the composite insulation typically greater than at least 30 seconds, while conventional insulation typically absorbs a water drop within 3 seconds. The composite insulation of the present invention is also configured to provide superior oleophobic properties (i.e. resistance to absorption of hydrophobic fluids). In this regard, for example, the oil drop disappearance time for the composite insulation typically greater than at least 15 seconds or at least 30 seconds, while conventional insulation typically absorbs an oil drop within 3 seconds.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for producing a composite insulation system, the method comprising:
   providing a braided tape;
   wrapping the braided tape around an exhaust component so that the braided tape conforms to the exhaust component;
   wrapping and tucking ends of the braided tape into adjacent wraps of the braided tape;
   positioning a self-molding fiber cover comprising an elastic structure over the braided tape to provide compression around the exhaust component;
   providing a composite matrix solution comprising a dispersion of ground thermoplastic polymer in an organic or non-organic solvent;
   applying the composite matrix solution to at least a portion of the braided tape and the self-molding fiber cover such that the composite matrix solution permeates the braided tape and the self-molding fiber cover; and
   heat-curing the composite matrix solution to thereby mechanically and chemically bond the braided tape and the self-molding fiber cover to form the composite insulation system.

2. The method of claim 1, wherein wrapping the braided tape around the exhaust component further comprises wrapping the braided tape such that the braided tape forms an abutment with at least a portion of an adjacent braided tape wrap, wherein the braided tape and the adjacent braided tape wrap do not overlap, wherein the abutment is a tight junction.

3. The method of claim 1, wherein method further comprises opening a planar portion of the braided tape and inserting one or more flanges of the exhaust component into the opened planar portion of the braided tape.

4. The method of claim 1, wherein the method further comprises wrapping the braided tape around a bend in the exhaust component such that the braided tape forms an abutment with at least a portion of an adjacent braided tape wrap, wherein the braided tape and the adjacent braided tape wrap do not overlap.

5. A composite insulation system comprising:
   a braided tape, the braided tape positioned on an exhaust component and conforming to the exhaust component;
   a self-molding fiber cover comprising an elastic structure covering the braided tape positioned on the exhaust component and providing compression around the exhaust component; and
   one or more composite matrix solutions permeating at least a portion of the braided tape and the self-molding fiber cover positioned on the exhaust component, the one or more composite matrix solutions comprising a dispersion of ground thermoplastic polymer in an organic or non-organic solvent, the one or more composite matrix solutions being heat-cured to thereby mechanically and chemically bond the braided tape and the self-molding fiber cover to form the composite insulation system.

6. The composite insulation system of claim 5, wherein the braided tape comprises at least one of glass fibers, thermoplastic fibers, and elastic fibers.

7. The composite insulation system of claim 5, wherein the braided tape is wrapped around the exhaust component such that the braided tape forms an abutment with at least a portion of an adjacent braided tape without overlap, wherein the abutment is a tight junction.

8. The composite insulation system of claim 5, wherein the braided tape is wrapped around the exhaust component and secured without external clamps.

9. The composite insulation system of claim 5, wherein a planar portion of the braided tape comprises at least one aperture structured to receive one or more flanges of the exhaust component therein.

10. The composite insulation system of claim 5, wherein the braided tape comprises elastic longitudinal tows and inelastic oblique tows.

11. The composite insulation system of claim 5, wherein the braided tape is a fiber based substrate comprising interwoven multiple fibers, at least one fiber selected from a group consisting of e-glass, s-glass, basalt, quartz, polytetrafluoroethylene (PTFE), meta-aramid, para-aramid, melamine, polybenzimidzole, polyimide, silica, oxidized polyacrylonitrile, carbon fiber, and ceramic.

12. The composite insulation system of claim 5, wherein the one or more composite matrix solutions comprise vermiculite, colloidal silica, potassium silicate, bitumen, and/or calcium aluminate.

13. The composite insulation system of claim 5, wherein the one or more composite matrix solutions comprise one or more additives selected from a group consisting of thermoplastic polymers, and thermoset polymers.

14. The composite insulation system of claim 5, wherein the one or more composite matrix solutions comprise a biocide.

15. The composite insulation system of claim 5, wherein the one or more composite matrix solutions are incorporated into the braided tape prior to positioning on the exhaust component.

* * * * *